(12) United States Patent
Yokoyama

(10) Patent No.: US 10,756,329 B2
(45) Date of Patent: Aug. 25, 2020

(54) ELECTRODE FOR SECONDARY BATTERY, SECONDARY BATTERY, AND ELECTRONIC APPARATUS

(71) Applicant: SEIKO EPSON CORPORATION, Tokyo (JP)

(72) Inventor: Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 101 days.

(21) Appl. No.: 16/173,595

(22) Filed: Oct. 29, 2018

(65) Prior Publication Data
US 2019/0131615 A1    May 2, 2019

(30) Foreign Application Priority Data
Oct. 30, 2017   (JP) .................................. 2017-208893

(51) Int. Cl.
*H01M 4/131* (2010.01)
*H01M 10/0525* (2010.01)
(Continued)

(52) U.S. Cl.
CPC ......... *H01M 4/131* (2013.01); *H01M 2/0207* (2013.01); *H01M 2/0217* (2013.01); *H01M 2/0287* (2013.01); *H01M 4/0404* (2013.01); *H01M 4/049* (2013.01); *H01M 4/136* (2013.01); *H01M 4/1391* (2013.01); *H01M 4/1397* (2013.01); *H01M 4/366* (2013.01); *H01M 4/386* (2013.01); *H01M 4/48* (2013.01); *H01M 4/623* (2013.01); *H01M 4/661* (2013.01); *H01M 10/052* (2013.01); *H01M 10/058* (2013.01); *H01M 10/0525* (2013.01);
(Continued)

(58) Field of Classification Search
None
See application file for complete search history.

(56) References Cited

U.S. PATENT DOCUMENTS

| | | | | |
|---|---|---|---|---|
| 2009/0104529 A1* | 4/2009 | Nishino | ............ | H01M 10/0525 429/223 |
| 2014/0011076 A1* | 1/2014 | Kanemoto | .............. | H01M 2/02 429/163 |

(Continued)

FOREIGN PATENT DOCUMENTS

| | | |
|---|---|---|
| JP | 2007-059387 A | 3/2007 |
| JP | 2009-215130 A | 9/2009 |

(Continued)

*Primary Examiner* — Scott J. Chmielecki
(74) *Attorney, Agent, or Firm* — Oliff PLC

(57) ABSTRACT

A lithium battery as a secondary battery has a battery cell including a first current collector which has a first face and a second face, a positive electrode active material particle which pierces the first current collector and is exposed from the first face and the second face, an electrolyte layer which covers the positive electrode active material particle exposed from the first face and the second face of the first current collector, a negative electrode as an electrode which is in contact with the electrolyte layer, and a second current collector which is in contact with the negative electrode. The battery cell is hermetically enclosed in a package in a state where one end portion which is a portion of the first current collector is exposed.

12 Claims, 13 Drawing Sheets

(51) Int. Cl.

| | |
|---|---|
| *H01M 2/02* | (2006.01) |
| *H01M 4/38* | (2006.01) |
| *H01M 4/48* | (2010.01) |
| *H01M 4/62* | (2006.01) |
| *H01M 4/66* | (2006.01) |
| *H01M 4/36* | (2006.01) |
| *H01M 10/058* | (2010.01) |
| *H01M 4/04* | (2006.01) |
| *H01M 4/136* | (2010.01) |
| *H01M 10/052* | (2010.01) |
| *H01M 4/1397* | (2010.01) |
| *H01M 4/1391* | (2010.01) |
| *H01M 10/0562* | (2010.01) |
| *H01M 4/02* | (2006.01) |
| *H01M 10/04* | (2006.01) |

(52) U.S. Cl.
CPC .... *H01M 10/0562* (2013.01); *H01M 10/0436* (2013.01); *H01M 2004/021* (2013.01); *H01M 2004/027* (2013.01); *H01M 2004/028* (2013.01); *H01M 2220/30* (2013.01)

(56) References Cited

U.S. PATENT DOCUMENTS

| | | | |
|---|---|---|---|
| 2015/0037655 A1* | 2/2015 | Zhou | H01M 10/0565 |
| | | | 429/149 |
| 2015/0221943 A1 | 8/2015 | Nishioka et al. | |
| 2017/0040122 A1* | 2/2017 | Yamamoto | H01G 11/24 |
| 2017/0104207 A1* | 4/2017 | Rubino | H01M 4/1393 |
| 2017/0309918 A1* | 10/2017 | Roumi | H01M 10/0565 |
| 2018/0145322 A1* | 5/2018 | Choi | H01M 4/525 |
| 2019/0148778 A1* | 5/2019 | Kubo | H01M 4/0459 |
| | | | 429/213 |
| 2020/0020954 A1* | 1/2020 | Sohn | H01M 10/0525 |
| 2020/0052276 A1* | 2/2020 | Song | H01M 4/139 |

FOREIGN PATENT DOCUMENTS

| | | |
|---|---|---|
| JP | 2010-062033 A | 3/2010 |
| JP | 2011-049125 A | 3/2011 |
| JP | 2013-206623 A | 10/2013 |
| JP | 5634362 B2 | 12/2014 |
| JP | 2016-039066 A | 3/2016 |
| WO | 2014/155990 A1 | 10/2014 |

* cited by examiner

ELECTRODE FOR SECONDARY BATTERY, SECONDARY BATTERY, AND ELECTRONIC APPARATUS

BACKGROUND

1. Technical Field

The present invention relates to an electrode for a secondary battery, a secondary battery, and an electronic apparatus including the secondary battery.

2. Related Art

Recently, as a power supply for many electronic apparatuses such as portable information apparatuses, a lithium battery (a primary battery or a secondary battery) has been used. The lithium battery includes a positive electrode, a negative electrode, and an electrolyte layer which is placed between the layers of these electrodes and mediates conduction of lithium ions while maintaining electrical insulation.

For example, JP-A-2010-62033 (Patent Document 1) discloses a positive electrode for a secondary battery to be favorably used in such a lithium battery which achieves both a high energy density and safety. The positive electrode for a secondary battery includes a positive electrode active material layer formed on at least one face of a current collector, and the positive electrode active material layer includes a positive electrode active material containing an iron compound, a binder, and a fluorine-based polymer in which one group binding to carbon is a hydrogen atom, a fluorine atom, or a trifluoromethyl group. Further, Patent Document 1 also discloses a secondary battery in which a plurality of power generation elements are laminated such that an electrolyte layer and a negative electrode are laminated in this order on the positive electrode for a secondary battery. It is said that according to such a configuration, by adding the fluorine-based polymer to the positive electrode, iron ions eluted from the positive electrode active material can be trapped, and therefore, the high-temperature durability of the secondary battery can be improved.

In Patent Document 1, it is considered that when the secondary battery having a high output and a high capacity density is tried to be designed, the positive electrode including the positive electrode active material layer and the current collector is thinned. In such a case, there arises a problem that the ratio of the volume of the current collector to the volume of the positive electrode is increased, and the capacity density is decreased instead.

Further, Patent Document 1 discloses a method in which a slurry containing a positive electrode active material (a lithium-containing iron compound), a fluorine-based polymer, an additive such as a binder, and a solvent is applied to the surface of a current collector, followed by drying and pressing as one example of a method for forming the positive electrode active material layer. However, in the case where the positive electrode active material layer is formed on both faces of the current collector in order to try to decrease the volume ratio of the current collector in the positive electrode, when the content ratio of the binder or the fluorine-based polymer in the slurry is increased to prevent the peeling of the current collector and the positive electrode active material layer, the electrical conduction property may be decreased. When an electrical conduction aid is further added to ensure the electrical conduction property, there arises a problem that this results in decreasing the ratio of the volume of the positive electrode active material to the volume of the positive electrode, ending up in a state where the capacity density is decreased.

SUMMARY

An advantage of some aspects of the invention is to solve at least a part of the problems described above and the invention can be implemented as the following forms or application examples.

Application Example

An electrode for a secondary battery according to an application example includes a current collector which has a first face and a second face, and an active material in a particulate form which pierces the current collector and is exposed from the first face and the second face.

According to this application example, the active material in a particulate form pierces the current collector, and therefore, the electrode for a secondary battery can be thinned, and an area where the current collector and the particle of the active material are in contact with each other can be increased as compared with the case where an electrode for a secondary battery is configured to place an active material in a particulate form on a first face or each of a first face and a second face of a current collector. Further, the volume ratio of the current collector in the electrode for a secondary battery including the active material and the current collector can be decreased. That is, an electrode for a secondary battery capable of improving the capacity density and output in a secondary battery as compared with the related art can be provided.

In the electrode for a secondary battery according to the above application example, it is preferred that the active material is a lithium composite metal oxide containing at least one type of transition metal and has an average particle diameter of 500 nm to 30 μm.

According to this configuration, by using a lithium composite metal oxide having an average particle diameter of 500 nm to 30 μm as the active material, the active material is chemically stable and has an excellent lithium ion conduction property, and therefore, an electrode for a secondary battery which is thin and also can improve the capacity density and output as compared with the related art can be provided.

In the electrode for a secondary battery according to the above application example, it is preferred that the current collector is composed of a metal material or an electrically conductive resin material.

According to this configuration, when the current collector is constituted using a metal material, the electrical resistance at the contact between the current collector and the active material can be reduced. Further, when the current collector is constituted using an electrically conductive resin material, adhesion between the active material and the current collector is easily ensured.

In the electrode for a secondary battery according to the above application example, an electrolyte layer which covers the active material in a particulate form exposed from the first face and the second face of the current collector may be included.

According to this configuration, the electrolyte layer is included, and therefore, an electrode for a secondary battery capable of easily constituting a secondary battery can be provided.

Application Example

A secondary battery according to an application example includes a first current collector which has a first face and a second face, an active material in a particulate form which pierces the first current collector and is exposed from the first face and the second face, an electrolyte layer which covers the active material in a particulate form exposed from the first face and the second face of the first current collector, an electrode which is in contact with the electrolyte layer, and a second current collector which is in contact with the electrode.

According to this configuration, an area where the active material in a particulate form and the electrolyte layer are in contact with each other can be increased, and therefore, a secondary battery which has a low internal resistance and excellent charge and discharge characteristics, and also can improve the capacity density and output can be provided.

In the secondary battery according to the above application example, it is preferred that a package which hermetically encloses the first current collector, the electrolyte layer, the electrode, and the second current collector is included.

According to this configuration, the first current collector, the electrolyte layer, the electrode, and the second current collector are hermetically enclosed in the package, and therefore, a secondary battery in which impurities such as moisture hardly enter from the outside, and also these elements are hardly peeled off from one another due to the external stress, and thus, the reliability is high can be provided.

In the secondary battery according to the above application example, it is preferred that the first current collector is composed of a metal material or an electrically conductive resin material.

According to this configuration, when the first current collector is constituted using a metal material, the electrical resistance at the contact between the first current collector and the active material can be reduced. Further, when the first current collector is constituted using an electrically conductive resin material, adhesion between the active material and the first current collector is easily ensured.

Application Example

A secondary battery according to an application example includes a positive electrode including a first current collector which has a first face and a second face, and a positive electrode active material in a particulate form which pierces the first current collector and is exposed from the first face and the second face, a negative electrode including a second current collector which has a third face and a fourth face, and a negative electrode active material in a particulate form which pierces the second current collector and is exposed from the third face and the fourth face, and an electrolyte layer which is provided between the positive electrode and the negative electrode.

According to this application example, the volume ratio of the current collector in each of the positive electrode and the negative electrode is decreased, and a contact area between the active material and the electrolyte layer in each of the positive electrode and the negative electrode can be ensured, and therefore, a secondary battery capable of easily improving the capacity density and output can be provided.

In the secondary battery according to the above application example, it is preferred that a package which hermetically encloses the positive electrode, the negative electrode, and the electrolyte layer in a state where a portion of the first current collector and a portion of the second current collector are exposed is included.

According to this configuration, the positive electrode, the negative electrode, and the electrolyte layer sandwiched between the positive electrode and the negative electrode are enclosed in the package in a hermetically sealed state, and therefore, a secondary battery in which impurities such as moisture hardly enter from the outside, and also these elements are hardly peeled off from one another due to the external stress, and thus, the reliability is high can be provided.

In the secondary battery according to the above application example, it is preferred that the first current collector and the second current collector are composed of a metal material or an electrically conductive resin material.

According to this configuration, in the case of using a metal material, the electrical resistance at the contact between the positive electrode active material and the first current collector or the electrical resistance at the contact between the negative electrode active material and the second current collector can be reduced. Further, in the case of using an electrically conductive resin material, adhesion between the positive electrode active material and the first current collector and adhesion between the negative electrode active material and the second current collector are easily ensured.

Application Example

An electronic apparatus according to an application example includes the secondary battery according to above application example.

According to this application example, the secondary battery capable of improving the capacity density and output as compared with the related art is included, and therefore, an electronic apparatus which can withstand use over a long period of time can be provided.

Application Example

A method for producing an electrode for a secondary battery according to an application example includes forming a metal sheet in which an active material in a particulate form is buried, and thinning the metal sheet by etching thereby exposing the active material in a particulate form from a first face and a second face of the thinned metal sheet.

According to this application example, as compared with the case where an electrode for a secondary battery is produced by applying a slurry containing an active material in a particulate form to the surface of a current collector to form a sheet, followed by heating the sheet, the active material in a particulate form pierces the thinned metal sheet and is exposed from the first face and the second face. Therefore, an area where the metal sheet which functions as the current collector and the particle of the active material are in contact with each other can be increased, and thus, the internal resistance can be reduced, and also the volume ratio of the metal sheet in the electrode including the active material and the metal sheet can be decreased. Therefore, an electrode for a secondary battery capable of improving the capacity density and output as compared with the related art can be produced.

Application Example

A method for producing an electrode for a secondary battery according to an application example includes preparing a slurry containing an active material in a particulate form, an electrically conductive resin material, and a solvent, forming a sheet using the slurry, and thinning the sheet by heating and pressurizing the sheet at a temperature equal to or higher than the electrically conductive resin material, thereby exposing the active material in a particulate form from a first face and a second face of the thinned sheet.

According to this application example, as compared with the case where an electrode for a secondary battery is produced by applying a slurry containing an active material in a particulate form to the surface of a current collector to form a sheet, followed by heating the sheet, the active material in a particulate form pierces the thinned sheet made of the resin and is exposed from the first face and the second face, and therefore, an area where the sheet which functions as the current collector and the particle of the active material are in contact with each other can be increased. In addition, the sheet is composed of the electrically conductive resin material, and therefore is easily thinned, and thus, the volume ratio of the sheet in the electrode including the active material and the sheet can be easily decreased. Therefore, even if the sheet is thinned, an electrode for a secondary battery capable of improving the capacity density and output as compared with the related art can be produced.

The method for producing an electrode for a secondary battery according to the above application example may include forming an electrolyte layer which covers the active material in a particulate form exposed from the first face and the second face.

According to this method, an electrolyte layer is formed in an electrode for a secondary battery, and therefore, an electrode for a secondary battery capable of easily constituting a secondary battery can be produced.

Application Example

A method for producing a secondary battery according to an application example includes forming an electrolyte layer which covers the active material in a particulate form exposed from the first face and the second face of the electrode for a secondary battery obtained using the method for producing an electrode for a secondary battery according to the above application example, forming an electrode which is in contact with the electrolyte layer, and forming a current collector which is in contact with the electrode.

According to this application example, an area where the active material in a particulate form and the electrolyte layer are in contact with each other can be increased, and therefore, a secondary battery which has a low internal resistance and excellent charge and discharge characteristics, and also can improve the capacity density and output can be produced.

In the method for producing a secondary battery according to the above application example, it is preferred that the method further includes hermetically enclosing the electrode for a secondary battery, the electrolyte layer, the electrode, and the current collector in a package.

According to this method, the electrode for a secondary battery in which the active material is exposed, the electrolyte layer, the electrode, and the current collector are hermetically enclosed in the package, and therefore, a secondary battery in which impurities such as moisture hardly enter from the outside, and also these elements are hardly peeled off from one another due to the external stress, and thus, the reliability is high can be produced.

Application Example

A method for producing a secondary battery according to an application example includes forming a positive electrode current collector layer in a sheet form in which a positive electrode active material in a particulate form is buried in a current collector material, thinning the positive electrode current collector layer, thereby obtaining a positive electrode sheet in which the positive electrode active material in a particulate form is exposed from a first face and a second face of the positive electrode current collector layer, forming a negative electrode current collector layer in a sheet form in which a negative electrode active material in a particulate form is buried in a current collector material, thinning the negative electrode current collector layer, thereby obtaining a negative electrode sheet in which the negative electrode active material in a particulate form is exposed from a third face and a fourth face of the negative electrode current collector layer, forming an electrolyte layer so as to cover the positive electrode active material exposed from the positive electrode sheet, forming the electrolyte layer so as to cover the negative electrode active material exposed from the negative electrode sheet, and laminating the positive electrode sheet and the negative electrode each having the electrolyte layer formed thereon.

According to this application example, the volume ratio of the positive electrode current collector layer or the negative electrode current collector layer, each of which functions as a current collector in each of the positive electrode sheet and the negative electrode sheet, is decreased, and also a contact area between the active material and the electrolyte layer in each of the positive electrode sheet and the negative electrode sheet can be ensured, and therefore, a secondary battery capable of easily improving the capacity density and output can be produced.

In the method for producing a secondary battery according to the above application example, it is preferred that the method further includes hermetically enclosing the positive electrode sheet and the negative electrode sheet which are laminated in a package.

According to this method, the positive electrode sheet and the negative electrode sheet, and the electrolyte layer sandwiched between the positive electrode sheet and the negative electrode sheet are enclosed in the package in a hermetically sealed state, and therefore, a secondary battery in which impurities such as moisture hardly enter from the outside, and also these elements are hardly peeled off from one another due to the external stress, and thus, the reliability is high can be produced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments embodying the invention will be described with reference to the drawings. The drawings to be used are displayed by being enlarged or shrunk as appropriate so that portions to be described are in a recognizable state.

First Embodiment

Secondary Battery

Figure 1:
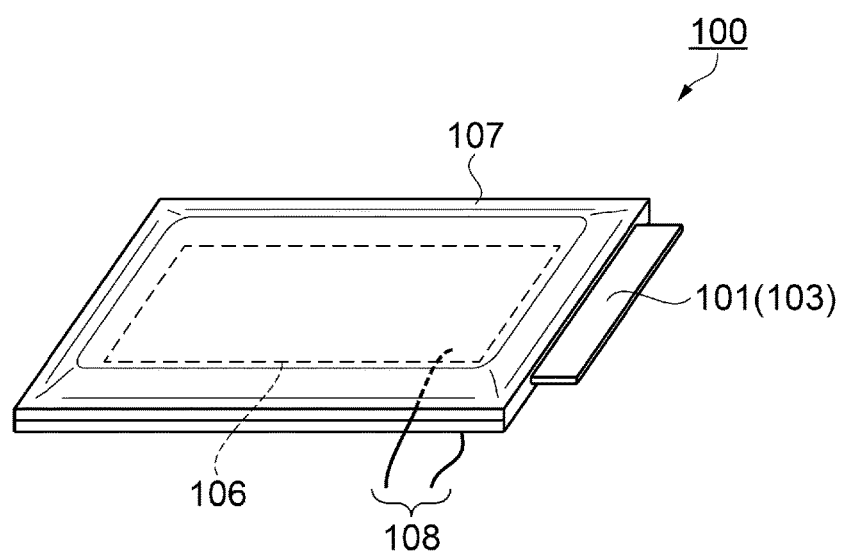
FIG. 1 is a schematic perspective view showing a lithium battery of a first embodiment.

In this embodiment, as an example of a secondary battery, a lithium battery using lithium ions as an active material will be described with reference to FIGS. 1 and 2. FIG. 1 is a schematic perspective view showing a lithium battery of a first embodiment, and FIG. 2 is a schematic cross-sectional view showing a structure of the lithium battery of the first embodiment.

As shown in FIG. 1, a lithium battery 100 of this embodiment is a secondary battery in a sheet form in which a battery cell is enclosed in a package 107. From one end of the package 107, a portion of a first current collector 101 in a sheet form constituting a positive electrode 103 of the battery cell is exposed and functions as a connection portion on the positive electrode side. Further, two lead wires 180 as connection portions on the negative electrode side connected to a second current collector 106 which is in contact with a negative electrode of the battery cell are drawn out and exposed. Such a lithium battery 100 in a sheet form has, for example, a short side length of 5 cm, a long side length of 10 cm, and a thickness of about 300 µm, and has a thin configuration.

The package 107 is provided for preventing moisture or the like from entering into the enclosed battery cell from the outside. Further, by sealing the periphery of the package 107 excluding the exposed portion of the first current collector 101, the battery cell is hermetically sealed so that the members constituting the battery cell are not peeled off from one another. As a preferred member for such a package 107, a laminate film obtained by laminating a resin film and a metal foil can be used.

Figure 2:
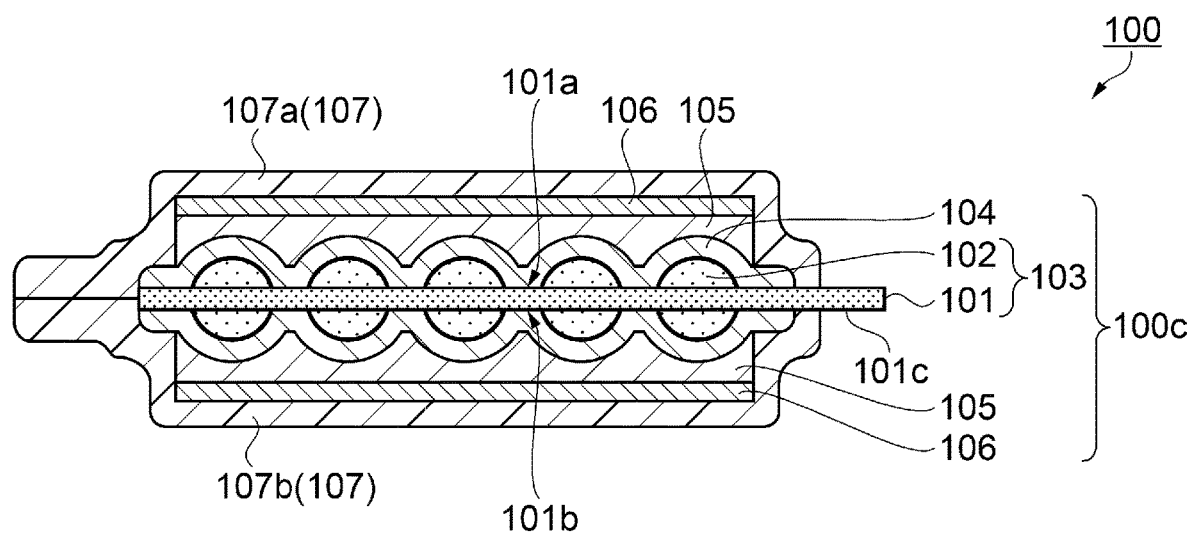
FIG. 2 is a schematic cross-sectional view showing a structure of the lithium battery of the first embodiment.

As shown in FIG. 2, the lithium battery 100 has a battery cell 100c including the positive electrode 103 as an electrode for a secondary battery, an electrolyte layer 104, a negative electrode 105 as an electrode, and the second current collector 106. The positive electrode 103 is configured to include the first current collector 101 in a sheet form and a plurality of positive electrode active materials 102 in a particulate form (positive electrode active material particles) which pierce the first current collector 101 and are exposed from a first face 101a and a second face 101b of the first current collector 101. The electrolyte layer 104 is provided so as to cover the plurality of positive electrode active materials 102 in a particulate form exposed from the first face 101a and the second face 101b of the first current collector 101. The negative electrode 105 is provided on the first face 101a side and the second face 101b side so as to come into contact with the electrolyte layer 104. The second current collector 106 is also provided on the first face 101a side and the second face 101b side so as to come into contact with the negative electrode 105.

The package 107 is constituted by two laminate films 107a and 107b. The battery cell 100c is sandwiched between the two laminate films 107a and 107b, and in a state where one end portion 101c which is a portion of the first current collector 101 in a sheet form is exposed, the battery cell 100c is hermetically enclosed, and the protruding edges of the two laminate films 107a and 107b are fused to each other. Each of the laminate films 107a and 107b in this embodiment is configured to laminate a polyethylene film having a thickness of, for example, 80 µm, an aluminum foil having a thickness of, for example, 7 µm, a polyethylene film having a thickness of, for example, 15 µm, and a PET film constituting the surface layer and having a thickness of, for example, 12 µm in this order from the inside. A configuration in which the battery cell 100c is enclosed by bonding the edges of the two laminate films 107a and 107b to each other through an adhesive layer may be adopted. Hereinafter, the respective portions constituting the battery cell 100c will be described in detail.

First Current Collector

The first current collector 101 may be an electrically conductive current collector material which does not cause a side reaction with a battery material such as an active material so as not to decrease its performance, and for example, a metal such as Be, Mg, Al, Sc, Ti, V, Cr, Mn, Fe, Co, Ni, Cu, Zn, or Ga, or an alloy obtained by combining these metals or metalloids can be used. In this embodiment, Cu (copper) is used in consideration of electrical connection to the positive electrode active material 102.

Positive Electrode Active Material

As the positive electrode active material 102, a lithium composite metal oxide containing lithium (Li) and also containing at least one type of transition metal selected from the group consisting of vanadium (V), chromium (Cr), manganese (Mn), iron (Fe), cobalt (Co), nickel (Ni), and copper (Cu) is used. Examples of such a lithium composite metal oxide include $LiCoO_2$, $LiNiO_2$, $LiMn_2O_4$, $Li_2Mn_2O_3$, $LiCr_{0.5}Mn_{0.5}O_2$, $LiFePO_4$, $LiFeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. Further, solid solutions in which the atoms in a crystal of any of these lithium composite metal oxides are partially substituted with another transition metal, a typical metal, an alkali metal, an alkaline earth metal, a lanthanoid, a chalcogenide, a halogen, or the like are also included in the lithium composite metal oxide, and any of these solid solutions can also be used as the positive electrode active material 102.

The plurality of positive electrode active materials 102 in a particulate form are placed so as to pierce the first current collector 101 composed of the above-mentioned metal material, thereby being electrically connected to each other through the first current collector 101. With respect to the size of the positive electrode active material 102 in a particulate form, for example, the average particle diameter thereof is preferably from 500 nm to 30 μm from the viewpoint of ensuring the contact area between the positive electrode active material 102 and the electrolyte layer 104 to achieve effective utilization thereof. More specifically, when the average particle diameter thereof is less than 500 nm, the cohesive force between particles is increased and it is difficult to make the positive electrode active material 102 pierce the first current collector 101 in a single particle state, and therefore, it becomes difficult to increase the contact area between the positive electrode active material 102 and the electrolyte layer 104. On the other hand, when the average particle diameter thereof exceeds 30 μm, it becomes difficult to utilize lithium inside the positive electrode active material 102 in charge and discharge. The average particle diameter thereof is determined based on this. In FIG. 2, for the convenience of illustration, the cross section of the positive electrode active material 102 in a particulate form is illustrated as a circle (that is, the positive electrode active material 102 has a spherical shape), however, the shape of the positive electrode active material 102 to be actually used is an irregular shape, and the sizes of the adjacent positive electrode active materials 102 are not necessarily the same. A method for producing the positive electrode 103 as the electrode for a secondary battery in which the plurality of positive electrode active materials 102 in a particulate form pierce the first current collector 101 and are exposed from the first face 101a and the second face 101b of the first current collector 101 will be described later.

Electrolyte Layer

As the electrolyte layer 104, a crystalline or amorphous solid electrolyte composed of an oxide, a sulfide, a halide, a nitride, a hydride, a boride, or the like is used.

Example of the oxide crystalline material include $Li_{0.35}La_{0.55}TiO_3$, $Li_{0.2}La_{0.27}NbO_3$, and a perovskite-type crystal or a perovskite-like crystal in which the elements in a crystal thereof are partially substituted with N, F, Al, Sr, Sc, Ta, a lanthanoid element, or the like, $Li_7La_3Zr_2O_{12}$, $Li_5La_3Nb_2O_{12}$, $Li_5BaLa_2TaO_{12}$, and a garnet-type crystal or a garnet-like crystal in which the elements in a crystal thereof are partially substituted with N, F, Al, Sr, Sc, Sb, Ta, Bi, a lanthanoid element, or the like, $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, and a NASICON-type crystal in which the elements in a crystal thereof are partially substituted with N, F, Al, Sr, Sc, Ta, a lanthanoid element, or the like, a LISICON-type crystal such as $Li_{14}ZnGe_4O_{16}$, and other crystalline materials such as $Li_{3.4}V_{0.6}Si_{0.4}O_4$, $Li_{3.5}V_{0.4}Ge_{0.6}O_4$ and $Li_{2+x}C_{1-x}B_xO_3$.

Example of the sulfide crystalline material include $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Examples of other amorphous materials include $Li_2O$—$TiO_2$, $La_2O_3$—$Li_2O$—$TiO_2$, $LiNbO_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_3PO_4$—$Li_4SiO_4$, $Li_4SiO_4$—$Li_4ZrO_4$, $SiO_2$—$P_2O_5$—$Li_2O$, $SiO_2$—$P_2O_5$—$LiCl$, $Li_2O$—$LiCl$—$B_2O_3$, $LiI$, $LiI$—$CaI_2$, $LiI$—$CaO$, $LiAlCl_4$, $LiAlF_4$, $LiF$—$Al_2O_3$, $LiBr$—$Al_2O_3$, $LiI$—$Al_2O_3/Li_{2.88}PO_{3.73}N_{0.14}$ $Li_3NI_2$, $Li_3N$—$LiI$—$LiOH$, $Li_3N$—$LiCl$, $Li_6NBr_3$, $Li_2S$—$SiS_2$, $Li_2S$—$SiS_2$—$LiI$, and $Li_2S$—$SiS_2$—$P_2S_5$. Among these, in consideration of formation of the electrolyte layer 104, $Li_{2+x}C_{1-x}B_xO_3$ which is a lithium composite oxide containing carbon (C) and boron (B) and has a lower melting point than that of the positive electrode active material 102 or an analogous material thereof is particularly preferably used.

As a method for forming the electrolyte layer 104 using the above-mentioned solid electrolyte, other than a solution process such as a so-called sol-gel method involving a hydrolysis reaction of an organometallic compound or the like or an organometallic thermal decomposition method, any method such as a CVD method using an appropriate metal compound in an appropriate gas atmosphere, an ALD method, a green sheet method or a screen printing method using a slurry of solid electrolyte particles, an aerosol deposition method, a sputtering method using an appropriate target and an appropriate gas atmosphere, a PLD method, or a flux method using a melt or a solution may be used. The lithium battery 100 of this embodiment is a solid-state secondary battery because the electrolyte layer 104 is formed using a solid electrolyte.

Negative Electrode

As a negative electrode active material which can constitute the negative electrode 105, $Nb_2O_5$, $V_2O_5$, $TiO_2$, $In_2O_3$, $ZnO$, $SnO_2$, $NiO$, ITO (indium tin oxide), AZO (Al-doped zinc oxide), GZO (Ga-doped zinc oxide), ATO (Sb-doped tin oxide), FTO (F-doped tin oxide), an anatase phase of $TiO_2$, lithium composite metal oxides such as $Li_4Ti_5O_{12}$ and $Li_2Ti_3O_7$, metals and alloys containing metals such as Li, Si, Sn, Si—Mn, Si—Co, Si—Ni, In, and Au, a carbon material, a material obtained by intercalation of lithium ions between layers of a carbon material, and the like can be exemplified. In consideration of the discharge capacity of the lithium battery 100 which is small and thin, the negative electrode 105 is preferably metallic lithium or a metal simple substance and an alloy which form a lithium alloy. The alloy is not particularly limited as long as it can occlude and release lithium, but is preferably an alloy containing any of metal or metalloid elements in groups 13 and 14 excluding carbon, more preferably a metal simple substance such as aluminum, silicon, or tin, or an alloy or a compound containing such an atom. These may be used alone or two or more types thereof may be used in any combination at any ratio. As the alloy, lithium alloys such as Li—Al, Li—Ni, Li—Si, Li—Sn, and Li—Sn—Ni, silicon alloys such as Si—Zn, tin alloys such as Sn—Mn, Sn—Co, Sn—Ni, Sn—Cu, and Sn—La, $Cu_2Sb$, $La_3Ni_2Sn_7$, and the like can be exemplified.

As a method for forming the negative electrode 105 using the above-mentioned negative electrode active material, other than a solution process such as a so-called sol-gel method involving a hydrolysis reaction of an organometallic compound or the like or an organometallic thermal decomposition method, any method such as a CVD method using an appropriate metal compound in an appropriate gas atmosphere, an ALD method, a green sheet method or a screen printing method using a slurry of a negative electrode active material, an aerosol deposition method, a sputtering method using an appropriate target and an appropriate gas atmosphere, a PLD method, a vacuum deposition method, a plating method, or a thermal spraying method may be used.

Second Current Collector

The second current collector 106 may be an electrically conductive current collector material which does not cause a side reaction with a battery material such as an active material so as not to decrease its performance in the same manner as the first current collector 101, and a metal such as Be, Mg, Al, Sc, Ti, V, Cr, Mn, Fe, Co, Ni, Cu, Zn, or Ga, or an alloy obtained by combining these metals or metalloids described above can be used. Further, it may be a material formed using an electrically conductive polymer such as polyaniline, polyacetylene, polythiophene, or polypyrrole. In addition, a material obtained by dispersing particles or fibers of the above-mentioned electrically conductive polymer or the above-mentioned metal or metalloid in a polymer such as polyvinylidene fluoride (PVDF), polyethylene, or polypropylene so as to impart an electrical conduction property to the polymer, or a material obtained by forming an electrically conductive layer on the polymer by a sputtering method, a vapor deposition method, a plating method, or the like may be used. As the form of the second current collector 106, other than a sheet form, any form such as a fibrous form or a mesh form may be used as long as the operation and effect of the invention are obtained. In this embodiment, Cu (copper) is used in consideration of electrical connection to the negative electrode 105.

Method for Producing Secondary Battery

Figure 3:
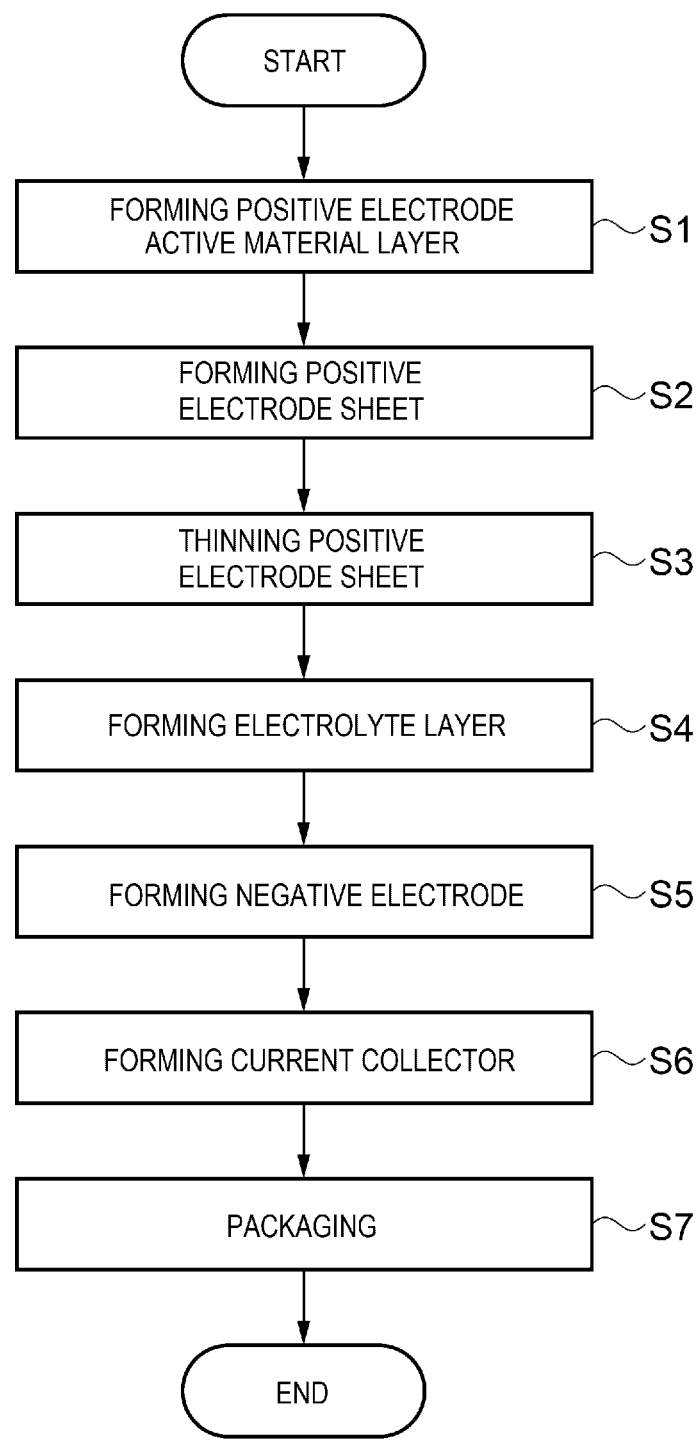
FIG. 3 is a flowchart showing a method for producing the lithium battery of the first embodiment.

Next, a method for producing the lithium battery 100 is cited as an example of a method for producing a secondary battery to which a method for producing an electrode for a secondary battery of the first embodiment is applied and described with reference to FIGS. 3 to 9. FIG. 3 is a flowchart showing the method for producing the lithium battery of the first embodiment, and FIGS. 4 to 9 are schematic cross-sectional views showing the method for producing the lithium battery of the first embodiment.

As shown in FIG. 3, the method for producing the lithium battery 100 of this embodiment includes a step of forming a positive electrode active material layer (step S1), a step of forming a positive electrode sheet (step S2), a step of thinning the positive electrode sheet (step S3), a step of forming an electrolyte layer 104 (step S4), a step of forming a negative electrode 105 (step S5), a step of forming a current collector (step S6), and a packaging step (step S7). The step S1 to the step S3 correspond to a method for producing a positive electrode 103 as the method for producing the electrode for a secondary battery.

Figure 4:
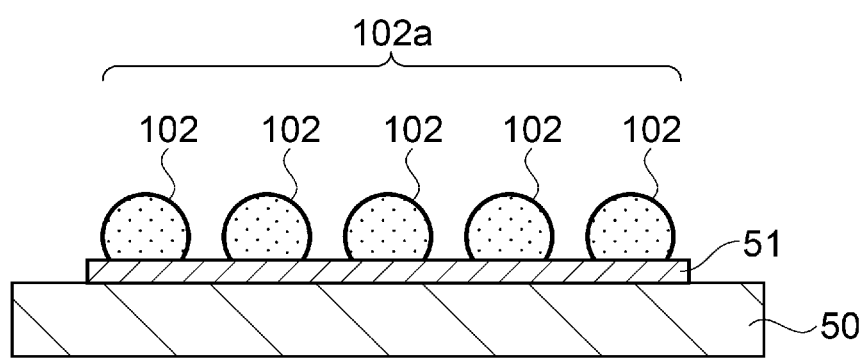
FIG. 4 is a schematic cross-sectional view showing the method for producing the lithium battery of the first embodiment.

In the step S1, as shown in FIG. 4, a 2-butanone solution of cyanoacrylate adjusted to a concentration of, for example, 2 wt % is applied to an alkali-free glass substrate 50 having a thickness of, for example, 0.1 mm, and positive electrode active materials 102 in a particulate form having an average particle diameter of, for example, 10 μm are placed thereon, followed by drying. By doing this, a positive electrode active material layer 102a composed of the plurality of positive electrode active materials 102 in a particulate form adhered to the alkali-free glass substrate 50 through an adhesive layer 51 composed of cyanoacrylate is formed. It is preferred that the positive electrode active material layer 102a is formed by adhering the positive electrode active materials 102 in a particulate form to the adhesive layer 51 while being spaced apart from each other from the viewpoint of effective utilization of the positive electrode active materials 102, however, the positive electrode active material layer 102a may be in a state where some positive electrode active materials 102 are in contact with each other. Then, the process proceeds to the step S2.

Figure 5:
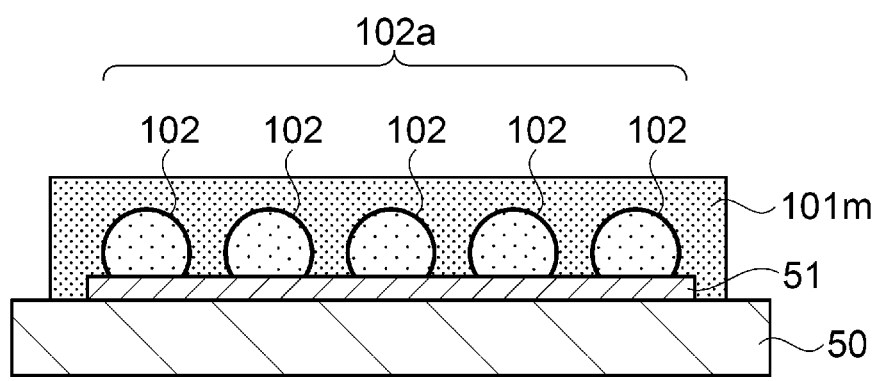
FIG. 5 is a schematic cross-sectional view showing the method for producing the lithium battery of the first embodiment.

In the step S2, the alkali-free glass substrate 50 having the positive electrode active material layer 102a formed thereon is subjected to an electroless plating treatment, whereby a copper plating layer 101m having a thickness of, for example, 20 μm in which the plurality of positive electrode active materials 102 in a particulate form are buried is formed as shown in FIG. 5. In the electroless plating treatment, the alkali-free glass substrate 50 having the positive electrode active material layer 102a formed thereon is immersed in a plating solution containing a copper compound, a stabilizing agent (complexing agent), a reducing agent, and the like, whereby the copper plating layer 101m is formed. The copper plating layer 101m in which the positive electrode active materials 102 are buried corresponds to a metal sheet or a positive electrode sheet in the invention.

As the copper compound, any of the copper compounds having high water solubility such as $CuSO_4.5H_2O$ (copper (II) sulfate pentahydrate) and $CuCl_2.2H_2O$ (copper(II) chloride dihydrate) can be favorably used. As the complexing agent for stabilizing the solubility of the copper compound, other than ethylenediaminetetraacetic acid, $KNaC_4H_4O_6.H_2O$ (potassium sodium tartrate hydrate), diethylenetriaminepentaacetic acid (DTPA), monoethanolamine, diethanolamine, triethanolamine, diethylenetriamine, triethylenetetramine, tetraethylenepentamine, gluconic acid, nitrilotriacetic acid, or the like can be used.

As the reducing agent, other than formaldehyde, glyoxylic acid, sodium hypophosphite, dimethylamine borane, hydrazine, or the like can be used.

As the stabilizing agent, a material which is expected to function as a complexing agent for cuprous ions is used, and a cyanide compound, a pyridyl derivative, or the like is favorably used. More specifically, other than sodium cyanide or pyridine, 1,10-phenanthrolinium chloride, 2,2-bipyridine, neocuproine, 2,2'-biquinoline, 4,4'-(2,9-dimethyl-1,10-phenanthroline-4,7-diyl)bis(sodium benzenesulfonate), benzoquinoline, dithizone, diphenyl carbazide, methyl orange, pyrrole, pyrazole, imidazole, 1,2,4-benzotriazole, triazine, nicotinic acid, thiourea, rubeanic acid, tetramethylthiourea, thiophene, 2-methylmercaptobenzothiazole, thiazole, thionalide, ammonium trans-diamminetetrakis(thiocyanato-N) chromate(III), cupron, cupferron, or the like can be used. As another additive, in order to enhance the stability of an aqueous solution (plating solution), a small amount of polyethylene glycol or a salt of selenium, vanadium, or the like can also be added.

The alkali-free glass substrate 50 having the copper plating layer 101*m* formed thereon is washed with a sufficient amount of pure water, and thereafter immersed in, for example, an organic solvent such as 2-butanone, ethyl acetate, or acetone, whereby the adhesive layer 51 is dissolved in the organic solvent and removed. By doing this, the copper plating layer 101*m* in which the positive electrode active materials 102 are buried is peeled off from the alkali-free glass substrate 50. Then, the process proceeds to the step S3.

Figure 6:
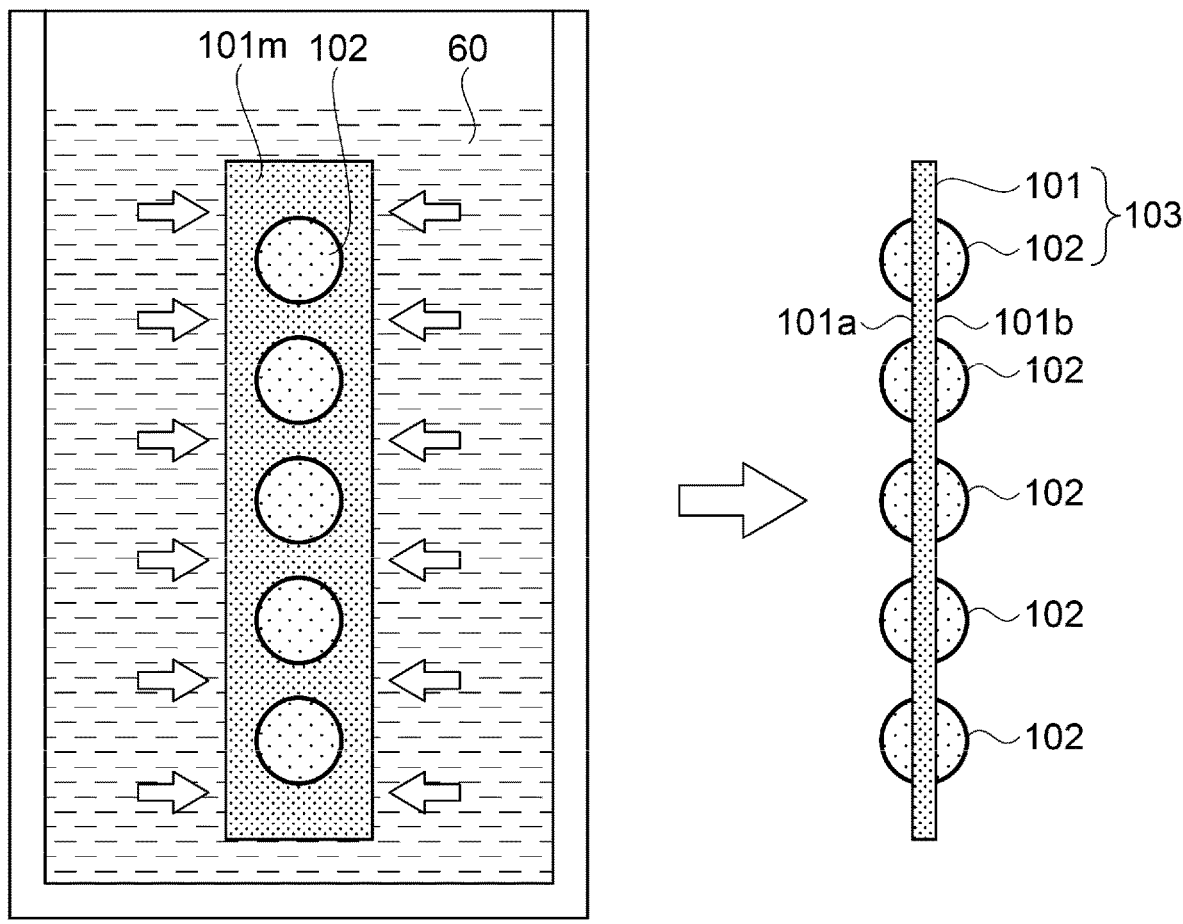
FIG. 6 is a schematic cross-sectional view showing the method for producing the lithium battery of the first embodiment.

In the step S3, the copper plating layer 101*m* as a metal sheet or a positive electrode sheet is thinned. More specifically, as shown in FIG. 6, the copper plating layer 101*m* is immersed in an aqueous citric acid solution 60 at a concentration of, for example, 1 mol/kg at 25° C. for about 10 minutes. By doing this, the copper plating layer 101*m* having a film thickness of about 20 µm is dissolved in the aqueous citric acid solution 60 and etched to a film thickness of about 5 µm from both sides. The copper plating layer 101*m* thinned by etching is washed with a sufficient amount of pure water, and then dried, whereby a positive electrode 103 in a sheet form in which the plurality of positive electrode active materials 102 in a particulate form are exposed from a first face 101*a* and a second face 101*b* of a first current collector 101 composed of the copper plating layer having a film thickness of about 5 µm is obtained. That is, the plurality of positive electrode active materials 102 in a particulate form go into a state where they pierce the first current collector 101 and are exposed from the first face 101*a* and the second face 101*b*. Then, the process proceeds to the step S4.

The metal sheet may be formed so as to bury the positive electrode active materials 102 therein by a sputtering method, a hot-dip plating method, or the like instead of the electroless plating treatment. In such a case, as a method for thinning the metal sheet, etching using an acidic or alkaline aqueous solution, ion beam etching, and electrochemical etching can be exemplified. Further, a method such as grinding by polishing or blast processing using a non-woven fabric carrying abrasive grains or the like may be used.

Figure 7:
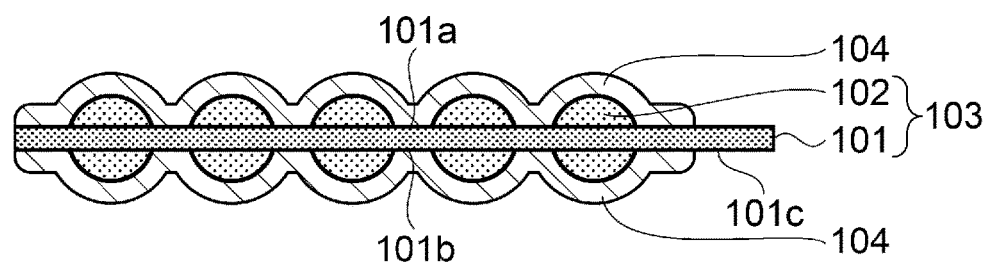
FIG. 7 is a schematic cross-sectional view showing the method for producing the lithium battery of the first embodiment.

In the step S4, as shown in FIG. 7, an electrolyte layer 104 is formed so as to cover the plurality of positive electrode active materials 102 in a particulate form exposed from the first face 101*a* and the second face 101*b* of the first current collector 101. As a method for forming the electrolyte layer 104, as described above, other than a solution process such as a sol-gel method or an organometallic thermal decomposition method, a CVD method, an ALD method, a green sheet method or a screen printing method using a slurry of solid electrolyte particles, an aerosol deposition method, a sputtering method, a PLD method, a flux method, and the like are exemplified. In this case, in order not to cover one end portion 101*c* of the first current collector 101 with the electrolyte layer 104, the end portion 101*c* is covered with a resist or the like beforehand. After the electrolyte layer 104 is formed, the resist or the like is peeled off. Then, the process proceeds to the step S5.

Figure 8:
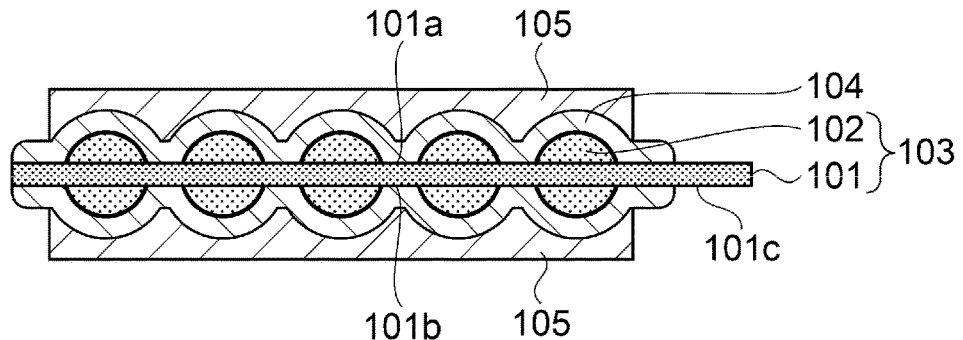
FIG. 8 is a schematic cross-sectional view showing the method for producing the lithium battery of the first embodiment.

In the step S5, as shown in FIG. 8, a negative electrode 105 is formed so as to come into contact with the electrolyte layer 104 on the first face 101*a* side and the second face 101*b* side of the first current collector 101. As a method for forming the negative electrode 105, as described above, other than a solution process such as a sol-gel method or an organometallic thermal decomposition method, a CVD method, an ALD method, a green sheet method or a screen printing method using a slurry of a negative electrode active material, an aerosol deposition method, a sputtering method, a PLD method, a vacuum deposition method, a plating method, a thermal spraying method, and the like are exemplified. Also in this case, in order to define a range where the negative electrode 105 is formed, a portion other than the range is masked with a resist or the like beforehand. Then, the process proceeds to the step S6.

Figure 9:
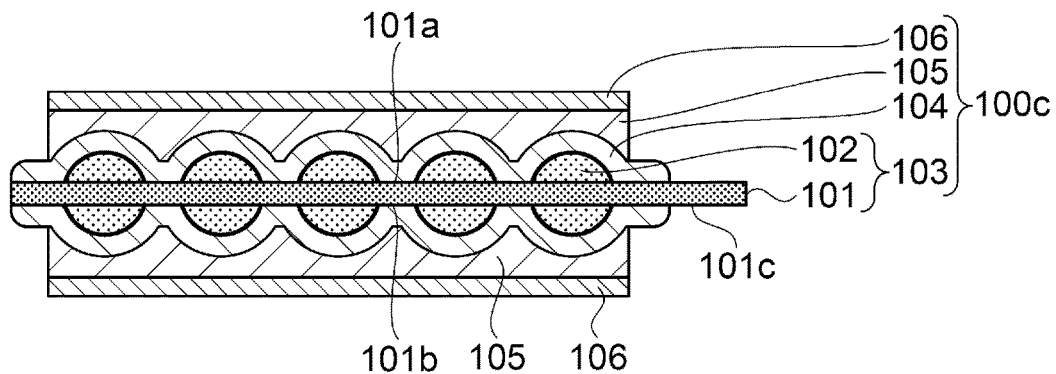
FIG. 9 is a schematic cross-sectional view showing the method for producing the lithium battery of the first embodiment.

In the step S6, as shown in FIG. 9, a second current collector 106 is formed so as to come into contact with the negative electrode 105. As a method for forming the second current collector 106, as described above, a sputtering method, a vacuum deposition method, a plating method, and the like are exemplified, however, in this embodiment, the second current collector 106 composed of Cu having a film thickness of about 1 µm is formed on the negative electrode 105 by a vacuum deposition method. By doing this, a battery cell 100*c* including the positive electrode 103, the electrolyte layer 104, the negative electrode 105, and the second current collector 106 is obtained. Then, the process proceeds to the step S7.

In the step S7, as shown in FIGS. 1 and 2, lead wires 108 are attached to the second current collector 106 by soldering. Further, the battery cell 100*c* is sandwiched and laminated between two laminate films 107*a* and 107*b* under reduced pressure, and the edges of the two laminate films 107*a* and 107*b* bonded to each other are fused to each other at a temperature of, for example, about 190° C., whereby a lithium battery 100 is formed.

According to the above-mentioned first embodiment, the following effects are obtained.

(1) The positive electrode 103 as the electrode for a secondary battery includes the positive electrode active material 102 in a particulate form which pierces the first current collector 101 and is exposed from the first face 101*a* and the second face 101*b* of the first current collector 101. Therefore, since the positive electrode active material 102 in a particulate form pierces the first current collector 101, the positive electrode 103 which is thin can be realized, and an area where the first current collector 101 and the particle of the positive electrode active material 102 are in contact with each other can be increased as compared with the case where the positive electrode 103 is configured to place the positive electrode active material 102 in a particulate form on the first face 101*a* or each of the first face 101*a* and the second face 101*b* of the first current collector 101. Further, the volume ratio of the first current collector 101 in the positive electrode 103 including the positive electrode active material 102 and the first current collector 101 can be decreased.

(2) The lithium battery 100 as the secondary battery includes the positive electrode 103, the electrolyte layer 104 which covers the positive electrode active material 102 in a particulate form exposed from the first face 101*a* and the second face 101*b* of the first current collector 101 constituting the positive electrode 103, the negative electrode 105 as the electrode which is in contact with the electrolyte layer 104, and the second current collector 106 which is in contact with the negative electrode 105. Therefore, an area where the positive electrode active material 102 in a particulate form and the electrolyte layer 104 are in contact with each other can be increased, and thus, the lithium battery 100 which has a low internal resistance and excellent charge and discharge characteristics, and also can improve the capacity density and output can be provided.

(3) The method for producing the positive electrode 103 as the method for producing an electrode for a secondary battery includes a step of forming the positive electrode active material layer 102*a* including the adhesive layer 51 and the positive electrode active material 102 in a particulate form on the alkali-free glass substrate 50, a step of forming the copper plating layer 101*m* (positive electrode sheet) in which the positive electrode active material 102 is buried by subjecting the alkali-free glass substrate 50 having the positive electrode active material layer 102*a* formed thereon to an electroless plating treatment, and a step of thinning the copper plating layer 101*m* (positive electrode sheet) by etching. By thinning the copper plating layer 101*m*, the first current collector 101 composed of Cu (copper) which is a metal material is formed. The positive electrode active material 102 in a particulate form is exposed from the first face 101*a* and the second face 101*b* of the thinned copper plating layer 101*m* (positive electrode sheet), and therefore, an area where the first current collector 101 and the particle of the positive electrode active material 102 are in contact with each other can be increased, and thus, the internal resistance can be reduced, and also the volume ratio of the first current collector 101 in the positive electrode 103 including the positive electrode active material 102 and the first current collector 101 can be decreased. Accordingly, the positive electrode 103 as the electrode for a secondary battery capable of improving the capacity density and output as compared with the related art can be produced.

(4) The method for producing the lithium battery 100 as the method for producing a secondary battery includes a step of forming the electrolyte layer 104 which covers the positive electrode active material 102 in a particulate form exposed from the first face 101*a* and the second face 101*b* of the first current collector 101 constituting the positive electrode 103, a step of forming the negative electrode 105 as the electrode which is in contact with the electrolyte layer 104, a step of forming the second current collector 106 which is in contact with the negative electrode 105, and a step of hermetically enclosing the positive electrode 103, the electrolyte layer 104, the negative electrode 105, and the second current collector 106 in the package 107.

An area where the positive electrode active material 102 in a particulate form and the electrolyte layer 104 are in contact with each other can be increased, and therefore, the lithium battery 100 which has a low internal resistance and excellent charge and discharge characteristics, and also can improve the capacity density and output can be produced.

Further, the positive electrode 103, the electrolyte layer 104, the negative electrode 105, and the second current collector 106 are hermetically enclosed in the package 107, and therefore, the lithium battery 100 in which impurities such as moisture hardly enter from the outside, and also these elements are hardly peeled off from one another due to the external stress, and thus, the reliability is high can be produced.

(5) The positive electrode active material 102 is a lithium composite metal oxide containing at least one type of transition metal and has an average particle diameter of 500 nm to 30 µm. Therefore, the positive electrode active material 102 is chemically stable and also has an excellent lithium ion conduction property, and thus, the positive electrode 103 as the electrode for a secondary battery which is thin and also can improve the capacity density and output as compared with the related art can be provided or produced.

Second Embodiment

Secondary Battery

Figure 10:
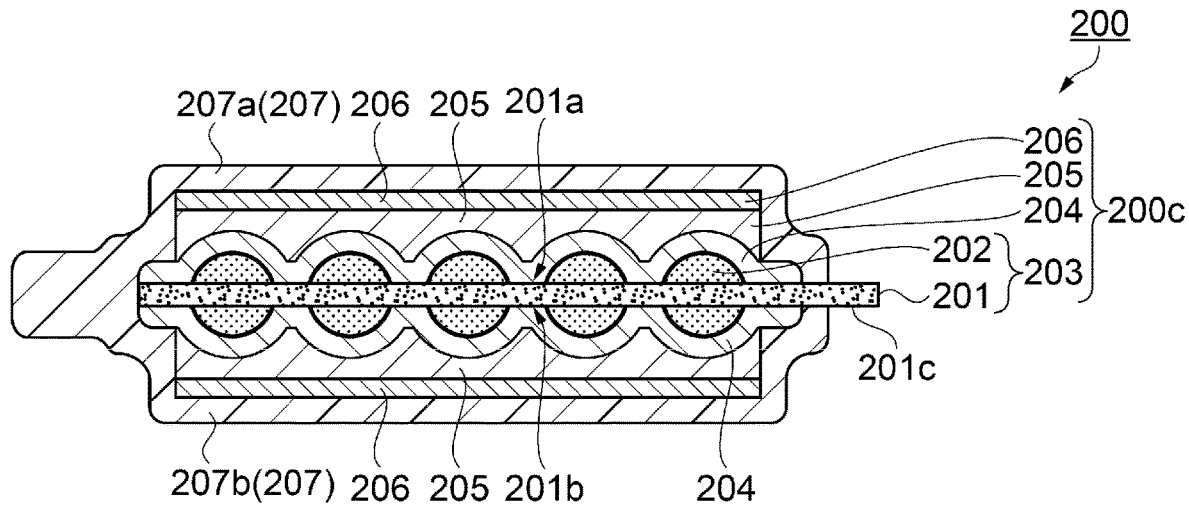
FIG. 10 is a schematic cross-sectional view showing a structure of a lithium battery as a secondary battery of a second embodiment.

Next, a secondary battery to which an electrode for a secondary battery of a second embodiment is applied will be described with reference to FIG. 10. FIG. 10 is a schematic cross-sectional view showing a structure of a lithium battery as the secondary battery of the second embodiment. The lithium battery of the second embodiment is in a sheet form in the same manner as the lithium battery 100 of the above-mentioned first embodiment, but is a solid-state secondary battery in which the configurations of a positive electrode and a negative electrode are made different from those of the first embodiment.

A lithium battery 200 of this embodiment has a battery cell 200*c* including a negative electrode 203 as an electrode for a secondary battery, an electrolyte layer 204, a positive electrode 205 as an electrode, and a second current collector 206. The negative electrode 203 is configured to include a first current collector 201 and a plurality of negative electrode active materials 202 in a particulate form (negative active material particles) which pierce the first current collector 201 and are exposed from a first face 201*a* and a second face 201*b* of the first current collector 201. The electrolyte layer 204 is provided so as to cover the plurality of negative electrode active materials 202 in a particulate form exposed from the first face 201*a* and the second face 201*b* of the first current collector 201. The positive electrode 205 is provided on the first face 201*a* side and the second face 201*b* side so as to come into contact with the electrolyte layer 204. The second current collector 206 is also provided on the first face 201*a* side and the second face 201*b* side so as to come into contact with the positive electrode 205.

The lithium battery 200 has a package 207 which hermetically encloses the battery cell 200*c* in a state where one end portion 201*c* which is a portion of the first current collector 201 in a sheet form is exposed. The package 207 is constituted by two laminate films 207*a* and 207*b*. The battery cell 200*c* is sandwiched and enclosed between the two laminate films 207*a* and 207*b*, and the protruding edges of the two laminate films 207*a* and 207*b* are fused to each other. Each of the laminate films 207*a* and 207*b* in this embodiment is configured to laminate a polyethylene film having a thickness of, for example, 80 µm, an aluminum foil having a thickness of, for example, 7 µm, a polyethylene film having a thickness of, for example, 15 µm, and a PET film constituting the surface layer and having a thickness of, for example, 12 µm in this order from the inside in the same manner as in the above-mentioned first embodiment. A configuration in which the battery cell 200*c* is enclosed by bonding the edges of the two laminate films 207*a* and 207*b* to each other through an adhesive layer may be adopted. Such a lithium battery 200 in a sheet form has, for example, a short side length of 5 cm, a long side length of 10 cm, and a thickness of about 300 µm, and has a thin configuration. Hereinafter, the respective portions constituting the battery cell 200*c* of the lithium battery 200 will be described.

First Current Collector

The first current collector 201 may be an electrically conductive current collector material which does not cause a side reaction with a battery material such as an active material so as not to decrease its performance, and in this embodiment, it is formed using an electrically conductive resin material (polymer) such as polyaniline, polyacetylene, polythiophene, or polypyrrole in consideration that thinning can be more easily performed as compared with the case where a metal material is used. In this embodiment, the first current collector 201 is formed using polythiophene further in consideration of an electrical conduction property. A detailed method for forming the first current collector 201 will be described later.

Negative Electrode Active Material

As the negative electrode active material 202, $Nb_2O_5$, $V_2O_5$, $TiO_2$, $In_2O_3$, ZnO, $SnO_2$, NiO, ITO (indium tin oxide), AZO (Al-doped zinc oxide), GZO (Ga-doped zinc oxide), ATO (Sb-doped tin oxide), FTO (F-doped tin oxide), an anatase phase of $TiO_2$, lithium composite metal oxides such as $Li_4Ti_5O_{12}$ and $Li_2Ti_3O_7$, metals and alloys containing metals such as Li, Si, Sn, Si—Mn, Si—Co, Si—Ni, In, and Au, a carbon material, a material obtained by intercalation of lithium ions between layers of a carbon material, and the like can be exemplified. In consideration of the discharge capacity of the lithium battery 200 which is small and thin, the negative electrode active material 202 is preferably selected from the crystalline lithium composite metal oxides described above.

The plurality of negative electrode active materials 202 in a particulate form are placed so as to pierce the first current collector 201 composed of the above-mentioned electrically conductive resin material, thereby being electrically connected to each other through the first current collector 201. With respect to the size of the negative electrode active material 202 in a particulate form, for example, the average particle diameter thereof is preferably from 500 nm to 30 μm from the viewpoint of ensuring the contact area between the negative electrode active material 202 and the electrolyte layer 204 to achieve effective utilization thereof. In FIG. 10, for the convenience of illustration, the cross section of the negative electrode active material 202 in a particulate form is illustrated as a circle (that is, the negative electrode active material 202 has a spherical shape), however, the shape of the negative electrode active material 202 to be actually used is an irregular shape, and the sizes of the adjacent negative electrode active materials 202 are not necessarily the same. A method for producing the negative electrode 203 as the electrode for a secondary battery in which the plurality of negative electrode active materials 202 in a particulate form pierce the first current collector 201 and are exposed from the first face 201a and the second face 201b of the first current collector 201 will be described later.

Electrolyte Layer

For the electrolyte layer 204, the same configuration as that of the electrolyte layer 104 in the lithium battery 100 of the above-mentioned first embodiment can be adopted. Therefore, a detailed description thereof is omitted, however, in consideration of the formation of the electrolyte layer 204, $Li_{2+x}C_{1-x}B_xO_3$ which is a lithium composite oxide containing carbon (C) and boron (B) and has a lower melting point than that of the above-mentioned negative electrode active material 202 or an analogous material thereof is particularly preferably used.

Positive Electrode

As a positive electrode active material which can constitute the positive electrode 205, the same configuration as that of the positive electrode active material 102 described in the above-mentioned first embodiment can be adopted. Therefore, a detailed description thereof is omitted, however, it is preferred to use a lithium composite metal oxide which is chemically stable and also has an excellent ion conduction property and contains at least one type of transition metal described above. As a method for forming the positive electrode 205 using the positive electrode active material, other than a solution process such as a so-called sol-gel method involving a hydrolysis reaction of an organometallic compound or the like or an organometallic thermal decomposition method, any method such as a CVD method using an appropriate metal compound in an appropriate gas atmosphere, an ALD method, a green sheet method or a screen printing method using a slurry of a positive electrode active material, an aerosol deposition method, a sputtering method using an appropriate target and an appropriate gas atmosphere, a PLD method, a vacuum deposition method, a plating method, or a thermal spraying method may be used.

Second Current Collector

The second current collector 206 may be an electrically conductive current collector material which does not cause a side reaction with a battery material such as an active material so as not to decrease its performance in the same manner as the first current collector 201, and a metal such as Be, Mg, Al, Sc, Ti, V, Cr, Mn, Fe, Co, Ni, Cu, Zn, or Ga, or an alloy obtained by combining these metals or metalloids can be used. Further, it may be a material formed using an electrically conductive polymer such as polyaniline, polyacetylene, polythiophene, or polypyrrole. In addition, a material obtained by dispersing particles or fibers of the above-mentioned electrically conductive polymer or the above-mentioned metal or metalloid in a polymer such as polyvinylidene fluoride (PVDF), polyethylene, or polypropylene so as to impart an electrical conduction property to the polymer, or a material obtained by forming an electrically conductive layer on the polymer by a sputtering method, a vapor deposition method, a plating method, or the like may be used. As the form of the second current collector 206, other than a sheet form, any form such as a fibrous form or a mesh form may be used as long as the operation and effect of the invention are obtained. In this embodiment, Al (aluminum) is used in consideration of electrical connection to the positive electrode 205.

Method for Producing Secondary Battery

Figure 11:
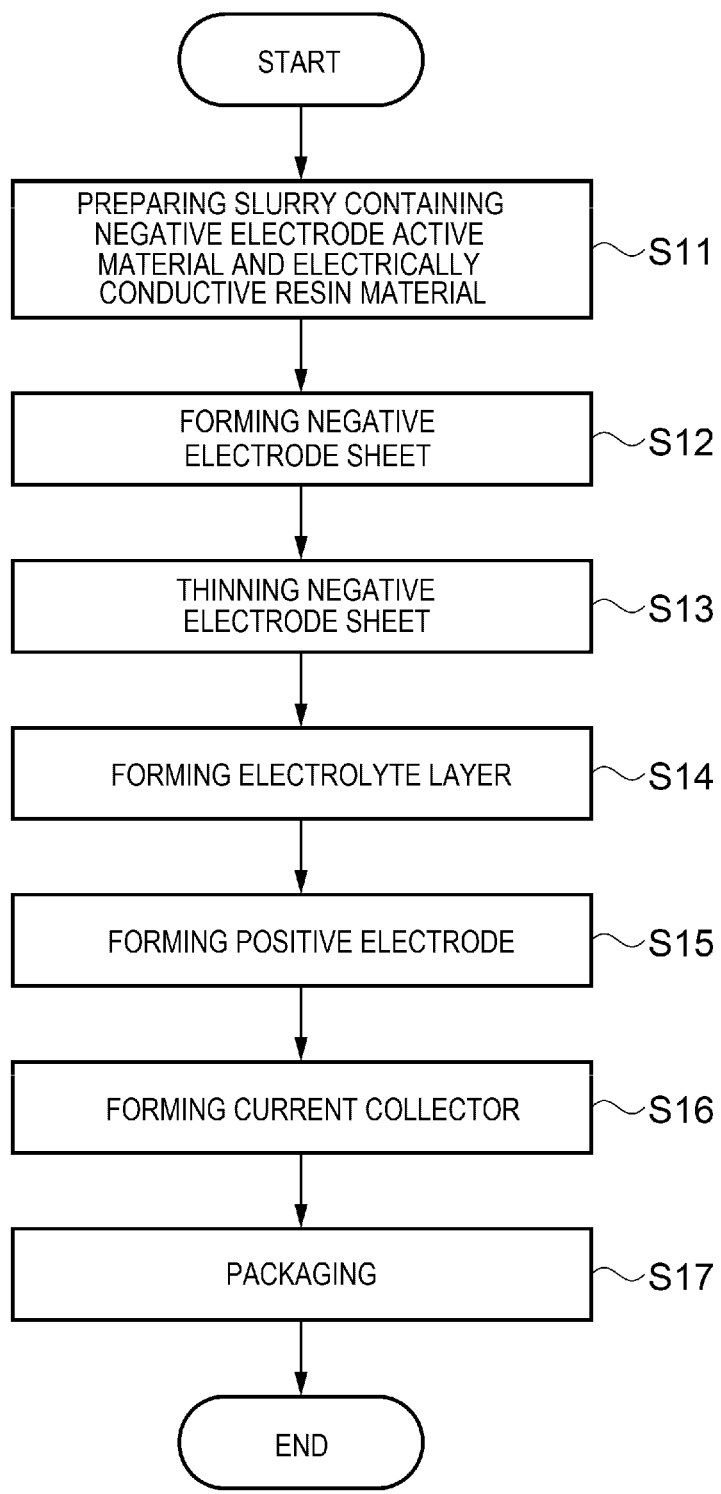
FIG. 11 is a flowchart showing a method for producing the lithium battery of the second embodiment.

Next, a method for producing the lithium battery 200 is cited as an example of a method for producing a secondary battery to which a method for producing an electrode for a secondary battery of the second embodiment is applied and described with reference to FIGS. 11 to 16. FIG. 11 is a flowchart showing the method for producing the lithium battery of the second embodiment, and FIGS. 12 to 16 are schematic cross-sectional views showing the method for producing the lithium battery of the second embodiment.

As shown in FIG. 11, the method for producing the lithium battery 200 of this embodiment includes a step of preparing a slurry containing a negative electrode active material 202 and an electrically conductive resin material (step S11), a step of forming a negative electrode sheet (step S12), a step of thinning the negative electrode sheet (step S13), a step of forming an electrolyte layer 204 (step S14), a step of forming a positive electrode 205 (step S15), a step of forming a current collector (step S16), and a packaging step (step S17). The step S11 to the step S13 correspond to a method for producing a negative electrode 203 as the method for producing an electrode for a secondary battery of the second embodiment.

In the step S11, a slurry containing a negative electrode active material 202, an electrically conductive resin material constituting a first current collector 201 later, and a solvent is prepared. In this embodiment, a negative electrode active material 202 having an average particle diameter d50 of about 10 μm is used. Then, the process proceeds to the step S12.

Figure 12:
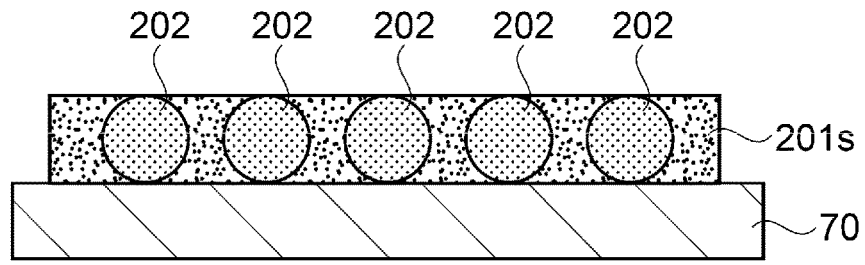
FIG. 12 is a schematic cross-sectional view showing the method for producing the lithium battery of the second embodiment.

In the step S12, as shown in FIG. 12, the slurry obtained in the step S11 is applied to a polyethylene terephthalate (PET) film 70 having a thickness of, for example, 150 μm using an automatic film applicator (manufactured by COTEC), whereby an electrically conductive polymer layer 201s as a negative electrode sheet is formed. The thickness of the electrically conductive polymer layer 201s is a thickness enough to bury the negative electrode active material 202 in the polymer layer 201s composed of the slurry, and is, for example, 20 μm which is twice the average particle diameter d50 of the negative electrode active material 202. Then, the process proceeds to the step S13.

Figure 13:
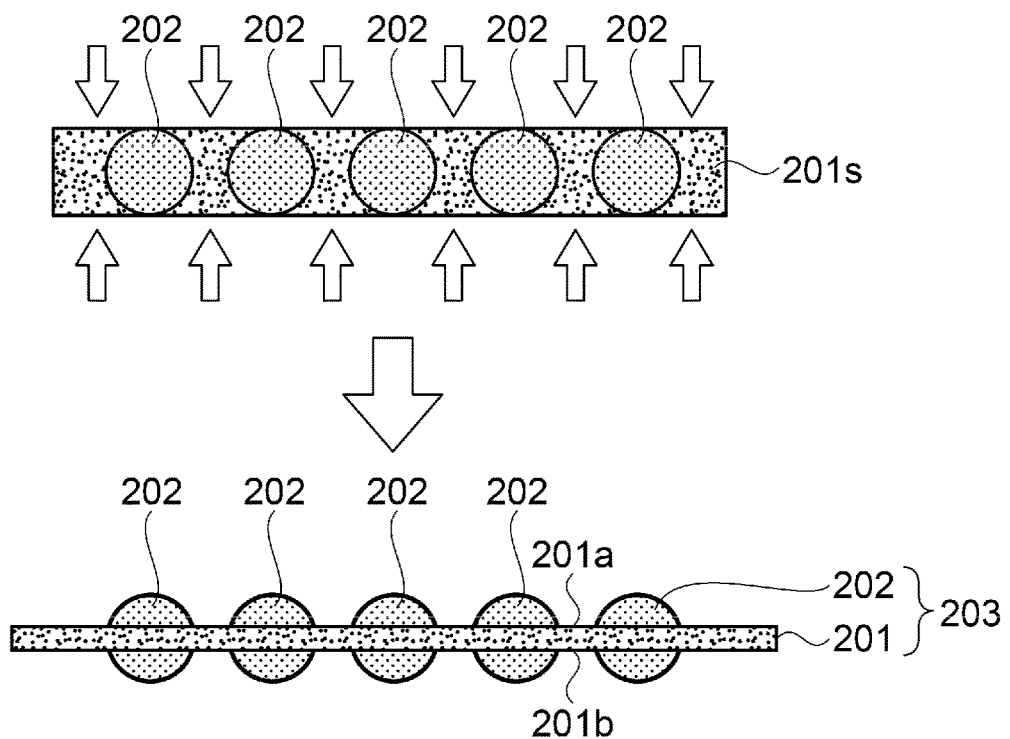
FIG. 13 is a schematic cross-sectional view showing the method for producing the lithium battery of the second embodiment.

In the step S13, the thickness of the electrically conductive polymer layer 201s as the negative electrode sheet obtained in the step S12 is reduced. More specifically, the PET film 70 having the polymer layer 201s formed thereon is placed on a flexible silicone plate heated to, for example, about 150° C. so that the polymer layer 201s comes into contact with the silicone plate and pressurized. Then, the PET film 70 is peeled off from the polymer layer 201s, and the polymer layer 201s is pressurized again on the heated silicone plate. As a method for pressurizing the polymer layer 201s, a method in which a pressurizing section composed of, for example, a flexible silicone rubber or the like is pressed against the polymer layer 201s so as to pressurize the polymer layer 201s, a method in which the polymer layer 201s is placed in a pressure vessel and the gas in the pressure vessel is pressurized, and the like are exemplified. By such a method, as shown in FIG. 13, the polymer layer 201s is thinned by pressurizing and compressing the polymer layer 201s from both sides. By doing this, a negative electrode 203 in which the negative electrode active material 202 in a particulate form is exposed from a first face 201a and a second face 201b of a first current collector 201 obtained by compressing the electrically conductive polymer layer 201s is obtained. The temperature when the polymer layer 201s is thermocompressed is set to a temperature equal to or higher than the softening point of the electrically conductive resin material constituting the polymer layer 201s. Then, the process proceeds to the step S14.

Figure 14:
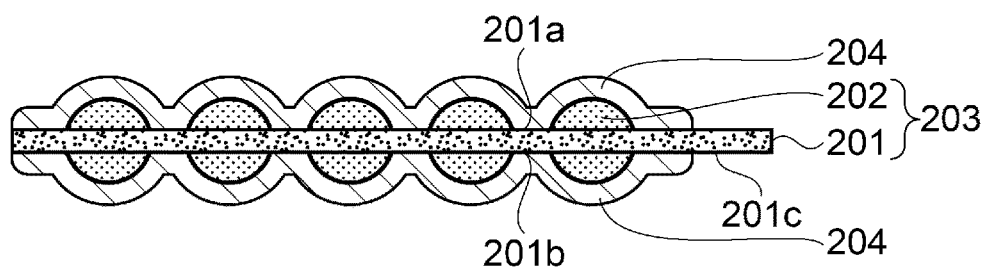
FIG. 14 is a schematic cross-sectional view showing the method for producing the lithium battery of the second embodiment.

In the step S14, as shown in FIG. 14, an electrolyte layer 204 is formed so as to cover the plurality of negative electrode active materials 202 in a particulate form exposed from the first face 201a and the second face 201b of the first current collector 201. As a method for forming the electrolyte layer 204, as described above, other than a solution process such as a sol-gel method or an organometallic thermal decomposition method, a CVD method, an ALD method, a green sheet method or a screen printing method using a slurry of solid electrolyte particles, an aerosol deposition method, a sputtering method, a PLD method, a flux method, and the like are exemplified. In this case, in order not to cover one end portion 201c of the first current collector 201 with the electrolyte layer 204, the end portion 201c is masked with a resist or the like beforehand. After the electrolyte layer 204 is formed, the resist or the like is peeled off. Then, the process proceeds to the step S15.

Figure 15:
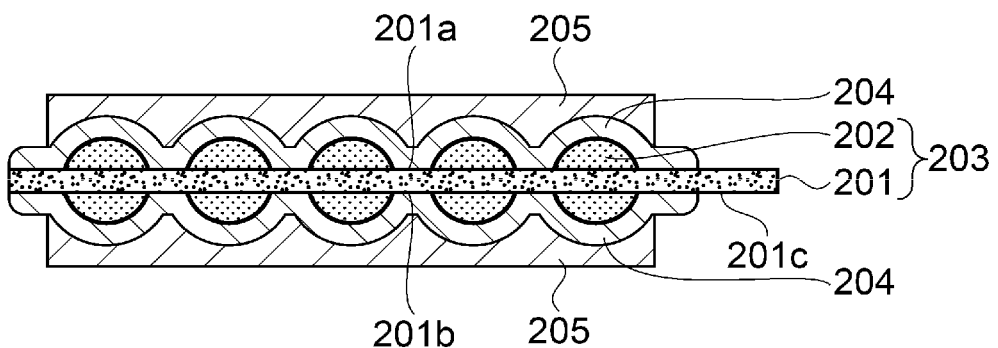
FIG. 15 is a schematic cross-sectional view showing the method for producing the lithium battery of the second embodiment.

In the step S15, as shown in FIG. 15, a positive electrode 205 is formed so as to come into contact with the electrolyte layer 204 on the first face 201a side and the second face 201b side of the first current collector 201. As a method for forming the positive electrode 205, as described above, other than a solution process such as a sol-gel method or an organometallic thermal decomposition method, a CVD method, an ALD method, a green sheet method or a screen printing method using a slurry of a positive electrode active material, an aerosol deposition method, a sputtering method, a PLD method, a vacuum deposition method, a plating method, a thermal spraying method, and the like are exemplified. Also in this case, in order to define a range where the positive electrode 205 is formed, a portion other than the range is masked with a resist or the like beforehand. Then, the process proceeds to the step S16.

Figure 16:
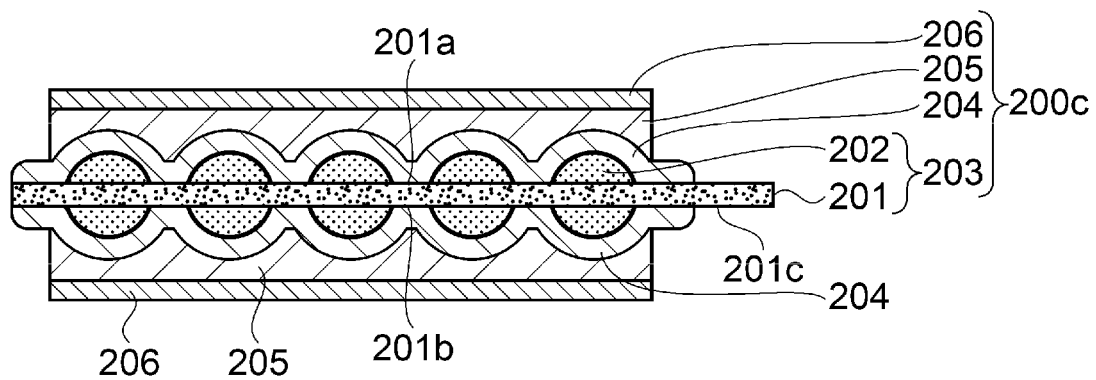
FIG. 16 is a schematic cross-sectional view showing the method for producing the lithium battery of the second embodiment.

In the step S16, as shown in FIG. 16, a second current collector 206 is formed so as to come into contact with the positive electrode 205. As a method for forming the second current collector 206, as described above, a sputtering method, a vacuum deposition method, a plating method, and the like are exemplified, however, in this embodiment, the second current collector 206 composed of Al having a film thickness of about 200 nm is formed on the positive electrode 205 by a sputtering method. By doing this, a battery cell 200c including the negative electrode 203, the electrolyte layer 204, the positive electrode 205, and the second current collector 206 is obtained. Then, the process proceeds to the step S17.

In the step S17, as shown in FIG. 10, the battery cell 200c is sandwiched and laminated between two laminate films 207a and 207b under reduced pressure, and the edges of the two laminate films 207a and 207b bonded to each other are fused to each other at a temperature of about 190° C., whereby a lithium battery 200 is formed. Before packaging is performed by the two laminate films 207a and 207b, a lead wire is attached to the second current collector 206 by soldering so as to be drawn out from the package 207.

According to the lithium battery 200 and the method for producing the same of the above-mentioned second embodiment, the following effects are obtained.

(1) The negative electrode 203 as the electrode for a secondary battery includes the negative electrode active material 202 in a particulate form which pierces the first current collector 201 and is exposed from the first face 201a and the second face 201b of the first current collector 201. Therefore, since the negative electrode active material 202 in a particulate form pierces the first current collector 201, the negative electrode 203 which is thin can be realized, and an area where the first current collector 201 and the particle of the negative electrode active material 202 are in contact with each other can be increased as compared with the case where the negative electrode 203 is configured to place the negative electrode active material 202 in a particulate form on the first face 201a or each of the first face 201a and the second face 201b of the first current collector 201. Further, the volume ratio of the first current collector 201 in the negative electrode 203 including the negative electrode active material 202 and the first current collector 201 can be decreased.

(2) The lithium battery 200 as the secondary battery includes the negative electrode 203, the electrolyte layer 204 which covers the negative electrode active material 202 in a particulate form exposed from the first face 201a and the second face 201b of the first current collector 201 constituting the negative electrode 203, the positive electrode 205 as the electrode which is in contact with the electrolyte layer 204, and the second current collector 206 which is in contact with the positive electrode 205. Therefore, an area where the negative electrode active material 202 in a particulate form and the electrolyte layer 204 are in contact with each other can be increased, and thus, the lithium battery 200 which has a low internal resistance and excellent charge and discharge characteristics, and also can improve the capacity density and output can be provided.

(3) The method for producing the negative electrode 203 as the method for producing an electrode for a secondary battery includes a step of preparing a slurry containing the negative electrode active material 202 and an electrically conductive resin material, a step of forming the electrically conductive polymer layer 201s (negative electrode sheet) in which the negative electrode active material 202 is buried by applying the slurry onto the PET film 70, followed by drying, and a step of thinning the electrically conductive polymer layer 201s (negative electrode sheet) by pressurizing and compressing the polymer layer 201s. The first current collector 201 obtained by thinning the electrically conductive polymer layer 201s is formed. The negative electrode active material 202 in a particulate form is exposed from the first face 201a and the second face 201b of the thinned electrically conductive polymer layer 201s (negative electrode sheet), and therefore, an area where the first current collector 201 and the particle of the negative electrode active material 202 are in contact with each other can be increased, and thus, the internal resistance can be reduced, and also the volume ratio of the first current collector 201 in the negative electrode 203 including the negative electrode active material 202 and the first current collector 201 can be decreased. Accordingly, the negative electrode 203 as the electrode for a secondary battery capable of improving the capacity density and output as compared with the related art can be produced.

(4) The method for producing the lithium battery 200 as the method for producing a secondary battery includes a step of forming the electrolyte layer 204 which covers the negative electrode active material 202 in a particulate form exposed from the first face 201a and the second face 201b of the first current collector 201 constituting the negative electrode 203, a step of forming the positive electrode 205 as the electrode which is in contact with the electrolyte layer 204, a step of forming the second current collector 206 which is in contact with the positive electrode 205, and a step of hermetically enclosing the negative electrode 203, the electrolyte layer 204, the positive electrode 205, and the second current collector 206 in the package 207.

An area where the negative electrode active material 202 in a particulate form and the electrolyte layer 204 are in contact with each other can be increased, and therefore, the lithium battery 200 which has a low internal resistance and excellent charge and discharge characteristics, and also can improve the capacity density and output can be produced.

Further, the negative electrode 203, the electrolyte layer 204, the positive electrode 205, and the second current collector 206 are hermetically enclosed in the package 207, and therefore, the lithium battery 200 in which impurities such as moisture hardly enter from the outside, and also these elements are hardly peeled off from one another due to the external stress, and thus, the reliability is high can be produced.

(5) The negative electrode active material 202 is a lithium composite metal oxide containing at least one type of transition metal and has an average particle diameter of 500 nm to 30 μm. Therefore, the negative electrode active material 202 is chemically stable and also has an excellent lithium ion conduction property, and thus, the negative electrode 203 as the electrode for a secondary battery which is thin and also can improve the capacity density and output as compared with the related art can be provided or produced.

As described in the above-mentioned first and second embodiments, the electrode for a secondary battery and the method for producing the same of the invention can be applied to both the positive electrode 103 and the negative electrode 203.

Third Embodiment

Figure 17:
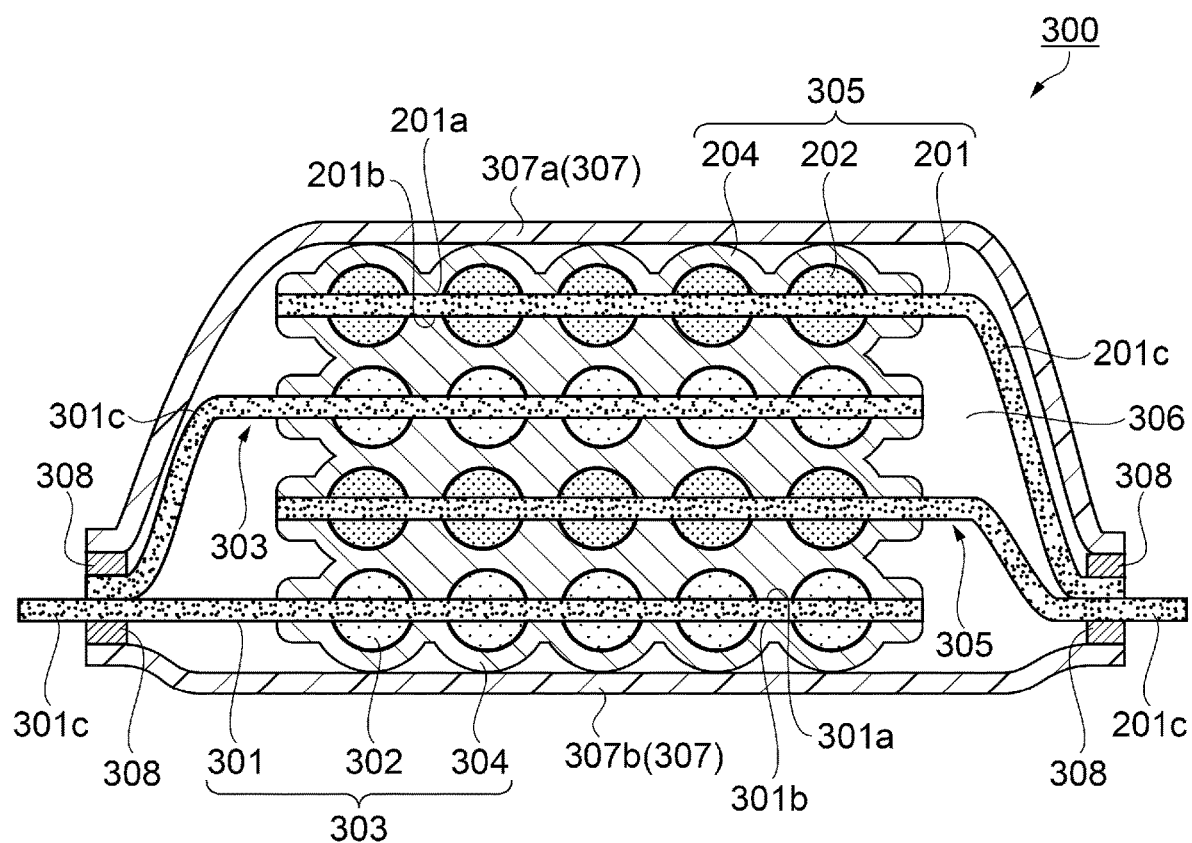
FIG. 17 is a schematic cross-sectional view showing a structure of a lithium battery as a secondary battery of a third embodiment.

Next, a secondary battery to which an electrode for a secondary battery of a third embodiment is applied will be described with reference to FIG. 17. FIG. 17 is a schematic cross-sectional view showing a structure of a lithium battery as the secondary battery of the third embodiment. The lithium battery of the third embodiment is a solid-state secondary battery in which the electrode for a secondary battery according to the invention is applied to both a positive electrode and a negative electrode, and also the positive electrode and the negative electrode are laminated. To the negative electrode, the configuration of the negative electrode 203 of the above-mentioned second embodiment is applied, and therefore, the same reference numerals are used for the same constituent components as those of the second embodiment, and a detailed description is omitted. Further, in the third embodiment, for the convenience of description, the negative electrode to which the negative electrode 203 of the above-mentioned second embodiment is applied is denoted by a reference numeral 305, the first current collector 201 of the negative electrode 203 is referred to as a second current collector 201, the first face 201a of the first current collector 201 is referred to as a third face 201a of the second current collector 201, and the second face 201b of the first current collector 201 is referred to as a fourth face 201b of the second current collector 201.

As shown in FIG. 17, a lithium battery 300 of this embodiment is configured to hermetically enclose a battery cell, in which the positive electrode 303, the negative electrode 305, the positive electrode 303, and the negative electrode 305 are laminated in this order, in a package 307. One end portion 301c which is a portion of a first current collector 301 in a sheet form constituting the positive electrode 303 of the battery cell is exposed from one end of the package 307 and functions as a connection portion on the positive electrode side. Further, one end portion 201c which is a portion of a second current collector 201 in a sheet form constituting the negative electrode 305 of the battery cell is exposed from the other end of the package 307 and functions as a connection portion on the negative electrode side.

The positive electrode 303 is configured to include the first current collector 301 in a sheet form, a positive electrode active material 302 in a particulate form provided so as to pierce the first current collector 301, and an electrolyte layer 304 provided so as to cover a plurality of positive electrode active materials 302 in a particulate form exposed from a first face 301a and a second face 301b of the first current collector 301.

The negative electrode 305 is configured to include the second current collector 201 in a sheet form, a negative electrode active material 202 in a particulate form provided so as to pierce the second current collector 201, and an electrolyte layer 204 provided so as to cover a plurality of negative electrode active materials 202 in a particulate form exposed from a third face 201a and a fourth face 201b of the second current collector 201.

The electrode for a secondary battery of this embodiment is configured to include a current collector, an active material in a particulate form provided so as to pierce the current collector, and an electrolyte layer provided so as to cover the active material in a particulate form, however, as in the above-mentioned first embodiment or second embodiment, the positive electrode 303 or the negative electrode 305 may be configured not to include an electrolyte layer. That is, the electrode may be configured such that an electrolyte layer is provided between the positive electrode 303 including the first current collector 301 and the positive electrode active material 302 and the negative electrode 305 including the second current collector 201 and the negative electrode active material 202.

Current Collector

Each of the first current collector 301 and the second current collector 201 may be an electrically conductive current collector material which does not cause a side reaction with a battery material such as an active material so as not to decrease its performance as described in the above-mentioned first embodiment or second embodiment, and a metal such as Be, Mg, Al, Sc, Ti, V, Cr, Mn, Fe, Co, Ni, Cu, Zn, or Ga, or an alloy obtained by combining these metals or metalloids can be used. Further, it may be a material formed using an electrically conductive polymer such as polyaniline, polyacetylene, polythiophene, or polypyrrole. In addition, a material obtained by dispersing particles or fibers of the above-mentioned electrically conductive polymer or the above-mentioned metal or metalloid in a polymer such as polyvinylidene fluoride (PVDF), polyethylene, or polypropylene so as to impart an electrical conduction property to the polymer, or a material obtained by forming an electrically conductive layer on the polymer by a sputtering method, a vapor deposition method, a plating method, or the like may be used. In this embodiment, from the viewpoint that a plurality of positive electrodes 303 and a plurality of negative electrodes 305 are alternately laminated, the above-mentioned electrically conductive polymer is adopted in consideration of flexibility.

Active Material

The positive electrode active material 302 and the negative electrode active material 202 are selected from lithium composite metal oxides described in the above-mentioned first embodiment, and are each a crystalline material in a particulate form having an average particle diameter d50 of 500 nm to 30 μm.

Electrolyte Layer

For the convenience of description, the electrolyte layers 204 and 304 are denoted by different reference numerals, however, the same solid electrolyte selected from crystalline or amorphous solid electrolytes composed of an oxide, a sulfide, a halide, a nitride, a hydride, a boride, or the like described in the above-mentioned first embodiment is used. In this embodiment, the battery cell is constituted by laminating the positive electrode 303 and the negative electrode 305 each having an electrolyte layer formed therein, and therefore, as the solid electrolyte, a material which is flexible and has a high ion conductivity is preferably selected. As such a solid electrolyte, a sulfide solid electrolyte is exemplified. As a method for forming the electrolyte layer 204 or 304, a method in which a mixture obtained by mixing sulfide solid electrolyte particles whose particle diameter is controlled to 40 nm to 200 nm and a binder (binding agent) at a ratio of 85:15 to 98:2 (parts by weight) is applied and dried, thereby forming the electrolyte layer is exemplified.

As an example of the sulfide solid electrolyte, an electrolyte prepared using a raw material composition containing, for example, $Li_2S$ and a sulfide of any of the elements in groups 13 to 15 can be exemplified. Specific examples thereof include $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$LiI$, $Li_2S$—$SiS_2$—$Li_4SiO_4$, $Li_2S$—$SiS_2$—$Li_3PO_4$, and $Li_{10}GeP_2S_{12}$. Among these, a crystalline and/or amorphous raw material composition composed of $Li_2S$—$P_2S_5$, $Li_2S$—$GeS_2$—$Ga_2S_3$, $Li_2S$—$LiI$—$P_2S_5$, $Li_2S$—$LiI$—$Li_2O$—$P_2S_5$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—$Li_3PO_4$—$P_2S_5$, $Li_2S$—$GeS_2$—$P_2S_5$, or $Li_{10}GeP_2S_{12}$ is preferred from the viewpoint of having a particularly high lithium ion conduction property.

As the binder, a binder which binds the solid electrolyte particle to the active material, and also is electrochemically stable is preferred. Examples of a polymer having such a property include polyvinylidene fluoride (PVDF), polytetrafluoroethylene, polyethylene, polypropylene, an aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, hexafluoropolypropylene, styrene-butadiene rubber, and carboxymethyl cellulose. Additional examples thereof include copolymers obtained by copolymerizing two or more types of materials or mixtures obtained by mixing two or more types of materials selected from tetrafluoroethylene, hexafluoroethylene, hexafluoropropylene, perfluoro alkyl vinyl ether, vinylidene fluoride, chlorotrifluoroethylene, ethylene, propylene, pentafluoropropylene, fluoromethyl vinyl ether, acrylic acid, and hexadiene. Among these, PVDF has high electrochemical stability, and therefore is particularly preferably used.

Package

The package 307 is constituted by two laminate films 307a and 307b. Each of the laminate films 307a and 307b in this embodiment is also configured to laminate a polyethylene film having a thickness of, for example, 80 μm, an aluminum foil having a thickness of, for example, 7 μm, a polyethylene film having a thickness of, for example, 15 μm, and a PET film constituting the surface layer and having a thickness of, for example, 12 μm in this order from the inside in the same manner as in the above-mentioned first embodiment. One ends (in FIG. 17, the left ends) of the two laminate films 307a and 307b are bonded to each other through adhesive layers 308 provided on the upper and lower sides of a part where one end portions 301c of the first current collectors 301 of the positive electrodes 303 in the first and third layers of the battery cell are overlapped with each other. The other ends (in FIG. 17, the right ends) of the two laminate films 307a and 307b are bonded to each other similarly through adhesive layers 308 provided on the upper and lower sides of a part where one end portions 201c of the second current collectors 201 of the negative electrodes 305 in the second and fourth layers of the battery cell are overlapped with each other.

A packaging method using the two laminate films 307a and 307b will be described later, however, a space 306 excluding the battery cell enclosed in the package 307 is decompressed. A configuration in which the space 306 is filled with an insulating thermoplastic resin or the like may be adopted.

With respect to the size of the lithium battery 300 after packaging, for example, it is a substantially rectangular parallelepiped shape having a width of 5 cm, a length of 10 cm, and a thickness of 500 μm.

Method for Producing Secondary Battery

Figure 18:
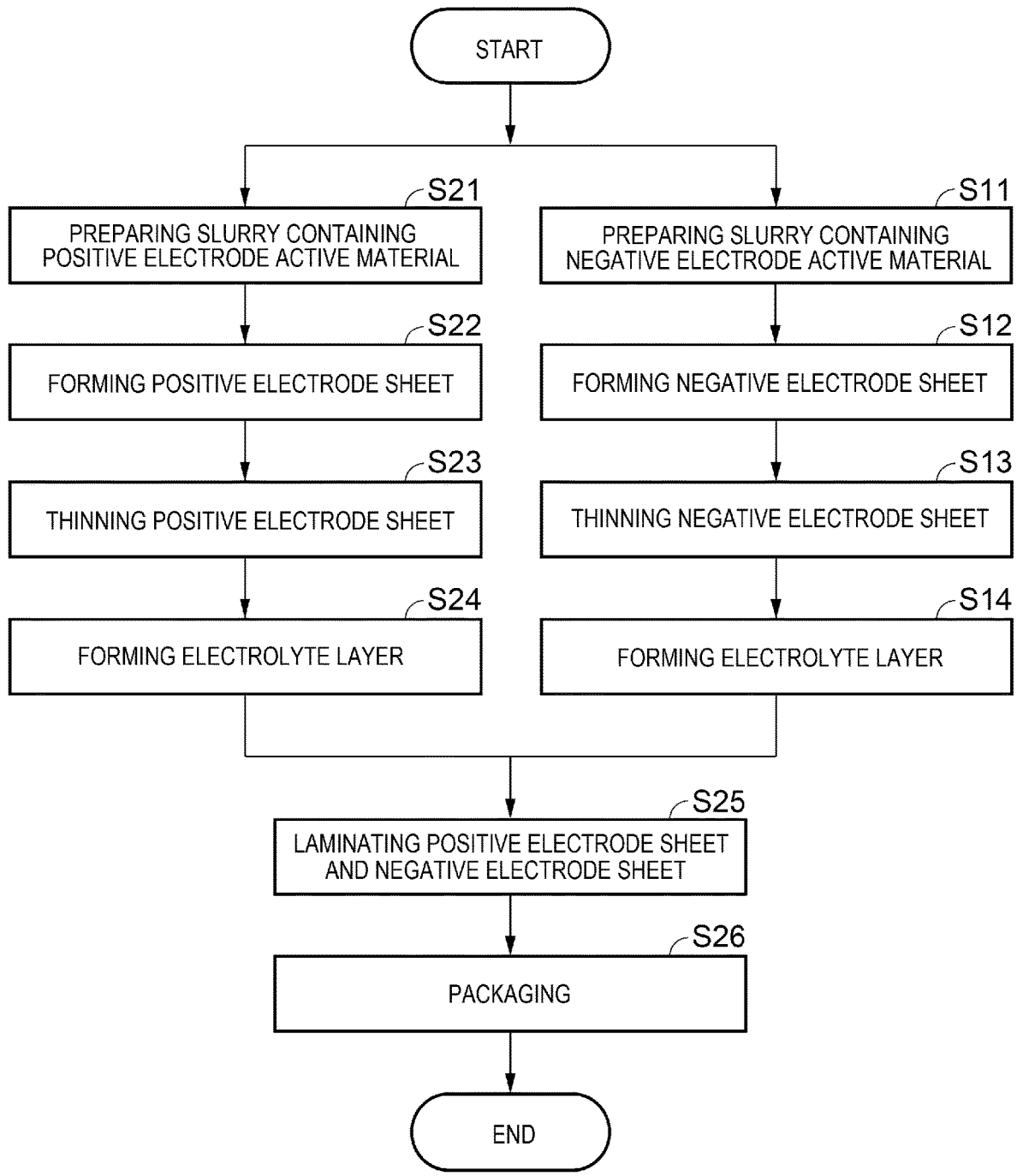
FIG. 18 is a flowchart showing a method for producing the lithium battery of the third embodiment.

Next, a method for producing the lithium battery 300 is cited as an example of a method for producing a secondary battery to which a method for producing an electrode for a secondary battery of the third embodiment is applied and described with reference to FIGS. 18 to 22. FIG. 18 is a flowchart showing the method for producing the lithium battery of the third embodiment, and FIGS. 19 to 22 are schematic cross-sectional views showing the method for producing the lithium battery of the third embodiment.

As shown in FIG. 18, the method for producing the lithium battery 300 of this embodiment includes a step of preparing a slurry containing a negative electrode active material (step S11), a step of forming a negative electrode sheet (step S12), a step of thinning the negative electrode sheet (step S13), and a step of forming an electrolyte layer (step S14). The method further includes a step of preparing a slurry containing a positive electrode active material (step S21), a step of forming a positive electrode sheet (step S22), a step of thinning the positive electrode sheet (step S23), and a step of forming an electrolyte layer (step S24). The method further includes a step of laminating the positive electrode sheet and the negative electrode sheet (step S25) and a packaging step (step S26). The step S11 to the step S14 are the same as the steps described in the above-mentioned second embodiment. Therefore, the step S21 to the step S26 will be described with reference to FIGS. 19 to 22.

In the step S21, a slurry containing a positive electrode active material 302, an electrically conductive resin material constituting a first current collector 301 later, and a solvent is prepared. In this embodiment, the positive electrode active material 302 having an average particle diameter d50 of about 10 μm is used. Then, the process proceeds to the step S22.

Figure 19:
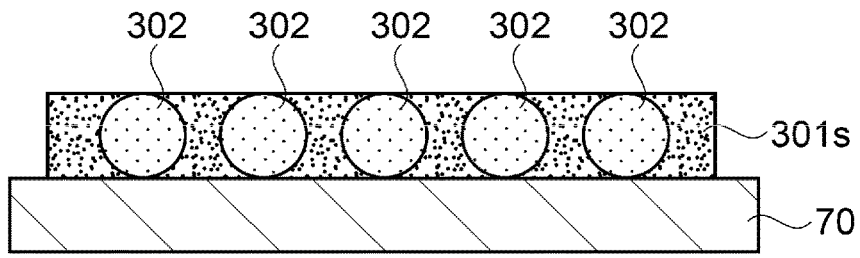
FIG. 19 is a schematic cross-sectional view showing the method for producing the lithium battery of the third embodiment.

In the step S22, as shown in FIG. 19, the slurry obtained in the step S21 is applied to a polyethylene terephthalate (PET) film 70 having a thickness of, for example, 150 μm using an automatic film applicator (manufactured by COTEC), whereby an electrically conductive polymer layer 301s as a positive electrode current collector layer is formed. The thickness of the electrically conductive polymer layer 301s is a thickness enough to bury the positive electrode active material 302 in the polymer layer 301s composed of the slurry, and is, for example, 20 μm which is twice the average particle diameter d50 of the positive electrode active material 302. By doing this, a positive electrode sheet in which the positive electrode active material 302 in a particulate form is buried in the polymer layer 301s is obtained. Then, the process proceeds to the step S23.

Figure 20:
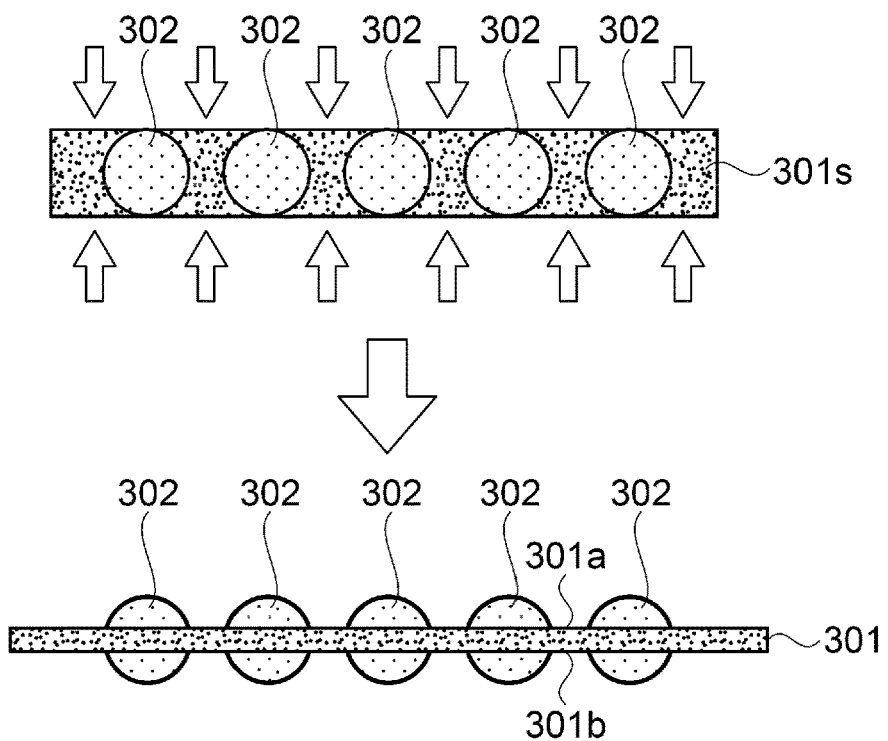
FIG. 20 is a schematic cross-sectional view showing the method for producing the lithium battery of the third embodiment.

In the step S23, the thickness of the electrically conductive polymer layer 301s in the positive electrode sheet obtained in the step S22 is reduced. More specifically, the PET film 70 having the polymer layer 301s formed thereon is placed on a flexible silicone plate heated to, for example, about 150° C. so that the polymer layer 301s comes into contact with the silicone plate and pressurized. Then, the PET film 70 is peeled off from the polymer layer 301s, and the polymer layer 301s is pressurized again on the heated silicone plate. As a method for pressurizing the polymer layer 301s, a method in which a pressurizing section composed of, for example, a flexible silicone rubber or the like is pressed against the polymer layer 301s so as to pressurize the polymer layer 301s, a method in which the polymer layer 301s is placed in a pressure vessel and the gas in the pressure vessel is pressurized, and the like are exemplified. By such a method, as shown in FIG. 20, the polymer layer 301s is thinned by pressurizing and compressing the polymer layer 301s from both sides. By doing this, the positive electrode active material 302 in a particulate form is in a state of being exposed from a first face 301a and a second face 301b of a first current collector 301 obtained by compressing the electrically conductive polymer layer 301s. The temperature when the polymer layer 301s is thermocompressed is set to a temperature equal to or higher than the softening point of the electrically conductive resin material constituting the polymer layer 301s. Then, the process proceeds to the step S24.

Figure 21:
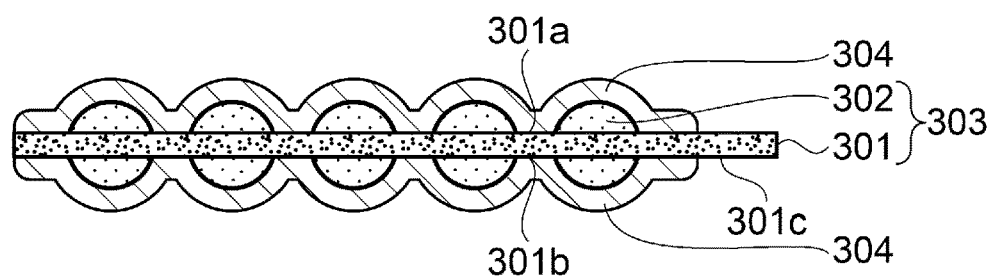
FIG. 21 is a schematic cross-sectional view showing the method for producing the lithium battery of the third embodiment.

In the step S24, as shown in FIG. 21, an electrolyte layer 304 is formed so as to cover the plurality of positive electrode active materials 302 in a particulate form exposed from the first face 301a and the second face 301b of the first current collector 301. As a method for forming the electrolyte layer 304, as described above, a method in which a mixture obtained by mixing sulfide solid electrolyte particles and a binder is applied is exemplified. In this case, in order not to cover one end portion 301c of the first current collector 301 with the electrolyte layer 304, the end portion 301c is masked with a resist or the like beforehand. After the electrolyte layer 304 is formed, the resist or the like is peeled off. By doing this, a positive electrode 303 including the first current collector 301, the positive electrode active materials 302, and the electrolyte layer 304 is formed. Then, the process proceeds to the step S25.

On the other hand, in the step S11 to the step S14 of forming a negative electrode 305, as described in the above-mentioned second embodiment, a slurry containing a negative electrode active material 202, an electrically conductive resin material constituting a second current collector 201 later, and a solvent is prepared. The obtained slurry is applied to a PET film 70 using an automatic film applicator (manufactured by COTEC), whereby an electrically conductive polymer layer 201s as a negative electrode current collector layer is formed (see FIG. 12). By doing this, a negative electrode sheet in which the negative electrode active material 202 in a particulate form is buried in the polymer layer 201s is obtained. Then, the polymer layer 201s in a sheet form is thinned by pressurizing and compressing the polymer layer 201s from both sides, whereby the second current collector 201 is formed. By doing this, the negative electrode active material 202 in a particulate form is in a state of being exposed from a third face 201a and a fourth face 201b of the second current collector 201 (see FIG. 13). Thereafter, an electrolyte layer 204 is formed so as to cover the exposed negative electrode active material 202 (see FIG. 14). The formation of the electrolyte layer 204 is the same as the method for forming the electrolyte layer 304 in the positive electrode 303 described above. By doing this, the negative electrode 305 including the second current collector 201, the negative electrode active material 202, and the electrolyte layer 204 is formed. Then, the process proceeds to the step S25.

Figure 22:
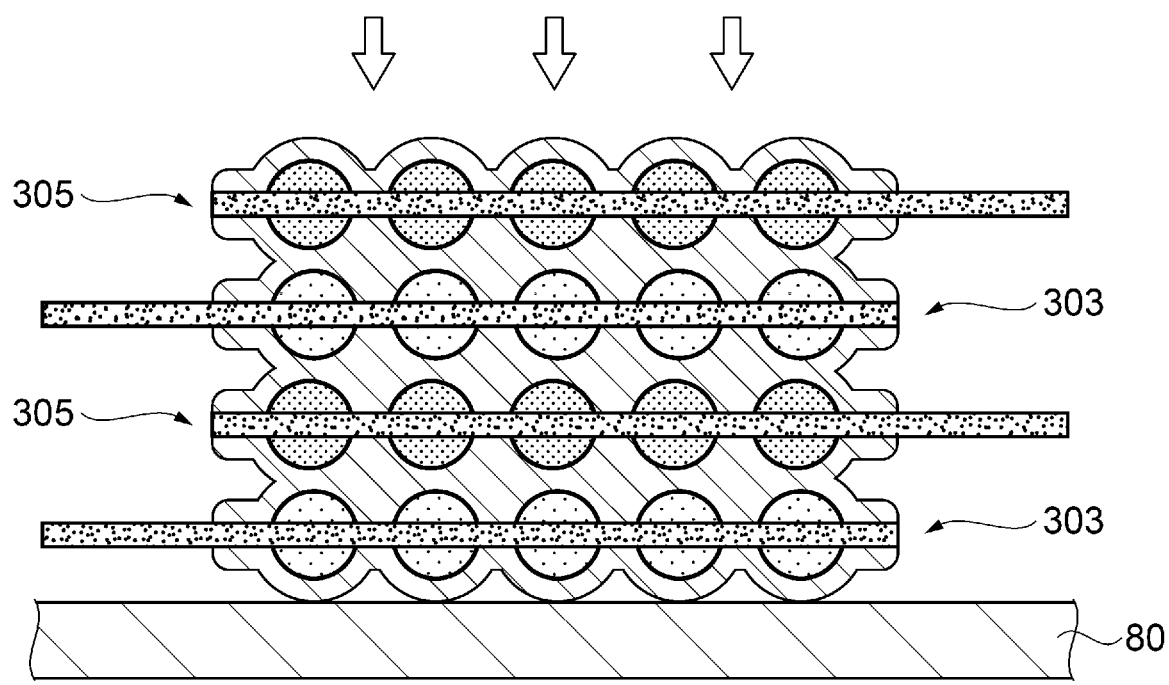
FIG. 22 is a schematic cross-sectional view showing the method for producing the lithium battery of the third embodiment.

In the step S25, as shown in FIG. 22, on a support substrate 80, the positive electrode 303, the negative electrode 305, the positive electrode 303, and the negative electrode 305 are laminated in this order and integrated with one another by applying pressure from above, whereby a battery cell is formed. Then, the process proceeds to the step S26.

In the step S26, as shown in FIG. 17, the battery cell obtained in the step S25 is sandwiched and laminated between two laminate films 307a and 307b under reduced pressure, and the edges of the two laminate films 307a and 307b bonded to each other through adhesive layers 308 are pressurized, whereby a lithium battery 300 is formed. In this case, one end portion 301c of the first current collector 301 in the positive electrode 303 which comes into contact with the laminate film 307b is exposed from the package 307. Further, the one end portions 301c of the first current collectors 301 in the two positive electrodes 303 are electrically connected to each other by pressurizing the edges of the laminate films 307a and 307b through the adhesive layers 308. The same also applies to the two negative electrodes 305, and one end portion 201c of the second current collector 201 in the negative electrode 305 which comes into contact with the laminate film 307a is exposed from the package 307. Further, the one end portions 201c of the second current collectors 201 in the two negative electrodes 305 are electrically connected to each other by pressurizing the edges of the laminate films 307a and 307b through the adhesive layers 308. By doing this, the lithium battery 300 is formed.

According to the lithium battery 300 and the method for producing the same of the above-mentioned third embodiment, the following effects are obtained.

(1) Each of the positive electrode 303 and the negative electrode 305 as the electrode for a secondary battery includes a current collector in a sheet form, an active material in a particulate form which pierces the current collector, and an electrolyte layer which is provided so as to cover the active material in a particulate form. Therefore, an area where the current collector and the particle of the active material are in contact with each other can be increased. The current collector is formed by thinning an electrically conductive polymer layer, and therefore, the volume ratio of the current collector in each of the positive electrode 303 and the negative electrode 305 can be decreased.

(2) Each of the positive electrode 303 and the negative electrode 305 is configured to include the electrolyte layer composed of the same solid electrolyte, and therefore, by laminating the positive electrode 303 and the negative electrode 305 in this order to constitute a battery cell, the lithium battery 300 which has a low internal resistance and excellent charge and discharge characteristics, and also can improve the capacity density and output as compared with the related art can be provided and produced.

(3) The battery cell obtained by laminating the positive electrode 303 and the negative electrode 305 in this order is hermetically enclosed in the package 307 in a state where the one end portion 301c of the first current collector 301 in the positive electrode 303 constituting the battery cell is exposed, and also one end portion 201c of the second current collector 201 in the negative electrode 305 is exposed. Therefore, the lithium battery 300 in which impurities such as moisture hardly enter from the outside, and also the laminated positive electrode 303 and the negative electrode 305 are hardly peeled off from each other due to the external stress, and thus, the reliability is high can be provided or produced.

Next, with respect to the lithium battery of this embodiment, the effects of Examples will be described by showing more specific Examples and a related art example. In the evaluation of lithium batteries of Examples and the related art example, a capacity density (mAh/cm$^3$) in a packaged battery cell was determined.

Example 1

Example 1 is a specific example of the lithium battery 100 shown in the above-mentioned first embodiment, and as shown in FIG. 2, a battery cell 100c is configured to include a positive electrode 103, an electrolyte layer 104, a negative electrode 105, and a second current collector 106. The positive electrode 103 is configured to include a first current collector 101 which is obtained by thinning a copper plating layer 101m and has a thickness of about 5 μm and a positive electrode active material 102 in a particulate form which pierces the first current collector 101 and is exposed from a first face 101a and a second face 101b. In Example 1, a positive electrode active material layer 102a was formed using LiCoO$_2$ (lithium cobalt oxide, hereinafter referred to as "LCO") particles (2.95 g) having an average particle diameter d50 of about 10 μm as the positive electrode active material 102 (see FIG. 4).

As a specific method of an electroless plating treatment for forming the copper plating layer 101m, a plating solution obtained by adjusting an aqueous solution containing 2.5 g/L copper(I) oxide as a copper compound, 74 g/L ethylenediaminetetraacetic acid (EDTA) as a complexing agent, g/L formaldehyde as a reducing agent, and 10 mg/L 2,2'-bipyridine as a stabilizing agent to a pH of 9 to 13 with, for example, potassium hydroxide or lithium hydroxide was used. In the plating solution heated to about 60° C., an alkali-free glass substrate 50 having a positive electrode active material layer 102a formed thereon was immersed for about 10 to 40 hours, whereby the copper plating layer 101m having a film thickness of 20 μm was formed. With respect to the plan view size of the copper plating layer 101m, the width is 5.0 cm and the length is 10.0 cm.

The copper plating layer 101m having the positive electrode active material layer 102a formed so as to be buried therein was immersed in a 1 mol/kg aqueous citric acid solution at 25° C. for 10 minutes, and immediately thereafter, it was washed with a sufficient amount of pure water, whereby the copper plating layer 101m was thinned to a thickness of about 5 μm. By doing this, a positive electrode sheet in which the LCO particles as the positive electrode active material 102 and copper were complexed was obtained.

The electrolyte layer 104 which covers the positive electrode active material 102 in a particulate form and the first current collector 101 was formed to a thickness of about 2.5 μm by sputtering in an Ar gas atmosphere using Li$_{2.2}$C$_{0.8}$B$_{0.2}$O$_3$ (hereinafter referred to as "LOBO") as a target. With respect to the plan view size of the electrolyte layer 104, the width is 4.2 cm and the length is 9.0 cm.

The negative electrode 105 which comes into contact with the electrolyte layer 104 was formed to a thickness of about 4.0 μm by vapor deposition of metallic lithium. With respect to the plan view size of the negative electrode 105, the width is 4.2 cm and the length is 9.0 cm.

The second current collector 106 which comes into contact with the negative electrode 105 was formed to a thickness of about 1 μm by vapor deposition of Cu. With respect to the plan view size of the second current collector 106, the width is 4.8 cm and the length is 9.7 cm. An Au (gold) paste was applied to a portion of the second current collector 106 composed of Cu, whereby a lead wire 108 was soldered. Subsequently, the battery cell 100c was sandwiched between two laminate films 107a and 107b molded into an appropriate size, and the edges of the two laminate films 107a and 107b were pressure-bonded to each other by heating to 190° C. under reduced pressure, whereby the lithium battery 100 of Example 1 was obtained.

Example 2

Example 2 is a specific example of the lithium battery 200 shown in the above-mentioned second embodiment, and as shown in FIG. 10, a battery cell 200c is configured to include a negative electrode 203, an electrolyte layer 204, a positive electrode 205, and a second current collector 206. The negative electrode 203 is configured to include a first current collector 201 which is obtained by thinning a polymer layer 201s and a negative electrode active material 202 in a particulate form which pierces the first current collector 201 and is exposed from a first face 201a and a second face 201b. In Example 2, as the negative electrode active material 202, Li$_4$Ti$_5$O$_{12}$ (lithium titanate, hereinafter referred to as "LTO") particles having an average particle diameter d50 of about 10 μm were used.

As a method for forming the polymer layer 201s, in a solution obtained by dissolving polythiophene (10 g) as an electrically conductive resin material in 2,5-dimethyltetrahydrofuran (90 g) as a solvent, an LTO powder (15 g) having an average particle diameter d50 of about 10 μm was mixed and dispersed as uniformly as possible, whereby a slurry was formed. Then, as shown in FIG. 12, the obtained slurry was applied to a polyethylene terephthalate (PET) film 70 having a thickness of 150 μm using an automatic film applicator (manufactured by COTEC), whereby the polymer layer 201s having a width of 5.0 cm, a length of 10.0 cm, and a thickness of about 20 μm was formed. The polymer layer 201s was thinned to a thickness of about 5 μm by pressurizing and compressing the polymer layer 201s from both sides as described above, whereby the first current collector 201 was formed. By doing this, the negative electrode 203 including the negative electrode active material 202 in a particulate form which pierces the first current collector 201 and is exposed from the first face 201a and the second face 201b was obtained.

The electrolyte layer 204 which covers the negative electrode active material 202 in a particulate form and the first current collector 201 was formed to a thickness of about 2.5 μm by sputtering in an Ar gas atmosphere using LOBO as a target. With respect to the plan view size of the electrolyte layer 204, the width is 4.2 cm and the length is 9.0 cm.

The positive electrode 205 which comes into contact with the electrolyte layer 204 was formed to a thickness of about 8.0 μm by sputtering LCO. With respect to the plan view size of the positive electrode 205, the width is 4.2 cm and the length is 9.0 cm.

The second current collector 206 which comes into contact with the positive electrode 205 was formed to a thickness of about 200 nm by sputtering Al (aluminum). With respect to the plan view size of the second current collector 206, the width is 4.8 cm and the length is 9.7 cm. An Au (gold) paste was applied to a portion of the second current collector 206 composed of Al, whereby a lead wire 108 was soldered. Subsequently, the battery cell 200c was sandwiched between two laminate films 207a and 207b molded into an appropriate size, and the edges of the two laminate films 207a and 207b were pressure-bonded to each other by heating to 190° C. under reduced pressure, whereby the lithium battery 200 of Example 2 was obtained.

Example 3

Example 3 is a specific example of the lithium battery 300 shown in the above-mentioned third embodiment, and as shown in FIG. 17, a positive electrode 303 and a negative electrode 305, a positive electrode 303, and a negative electrode 305 were laminated in this order and pressure-bonded to one another, whereby a battery cell was formed.

The positive electrode 303 is configured to include a first current collector 301 which is obtained by thinning a polymer layer 301s, and a positive electrode active material 302 in a particulate form which pierces the first current collector 301 and is exposed from a first face 301a and a second face 301b. In Example 3, as the positive electrode active material 302, LCO particles having an average particle diameter d50 of about 10 μm were used.

The negative electrode 305 is configured to include a first current collector 201 which is obtained by thinning a polymer layer 201s, and a negative electrode active material 202 in a particulate form which pierces the first current collector 201 and is exposed from a third face 201a and a fourth face 201b. In Example 3, as the negative electrode active material 202, LTO particles having an average particle diameter d50 of about 10 μm were used.

As a method for forming the polymer layer 301s, in a solution obtained by dissolving polythiophene (10 g) as an electrically conductive resin material in 2,5-dimethyltetrahydrofuran (90 g) as a solvent, an LCO powder (15 g) having an average particle diameter d50 of about 10 μm was added and mixed, whereby a slurry was formed. Then, as shown in FIG. 19, the obtained slurry was applied to a polyethylene terephthalate (PET) film 70 having a thickness of 150 μm using an automatic film applicator (manufactured by COTEC), whereby the polymer layer 301s having a width of 5.0 cm, a length of 10.0 cm, and a thickness of about 20 μm was formed. The polymer layer 301s was thinned to a thickness of about 5 μm by pressurizing and compressing the polymer layer 301s from both sides as described above, whereby the first current collector 301 was formed.

Subsequently, the electrolyte layer 304 was formed so as to cover the positive electrode active material 302 in a particulate form exposed from the first face 301a and the second face 301b of the first current collector 301. As a method for forming the electrolyte layer 304, in a powder (20 g) obtained by mixing amorphous particles of Li$_2$S—Li$_3$PO$_4$—P$_2$O$_5$, having an average particle diameter of 100 nm as a sulfide solid electrolyte and polyvinylidene fluoride (PVDF) as a binder at a ratio of 98:2 (parts by weight), N-methylpyrrolidinone (80 g) as a solvent was added, followed by kneading, and the resulting material was applied to the first face 301a and the second face 301b of the first current collector 301, on which the LCO particles were exposed. The resulting material was dried for 2 hours in a vacuum drying furnace at 120° C., whereby the electrolyte layer 304 having a thickness of about 30 μm was formed. By doing this, the positive electrode 303 including the positive electrode active material 302 in a particulate form piercing the first current collector 301 and exposed from the first face 301a and the second face 301b, and the electrolyte layer 304 was obtained.

As a method for forming the polymer layer 201s, in a solution obtained by dissolving polythiophene (10 g) as an electrically conductive resin material in 2,5-dimethyltetrahydrofuran (90 g) as a solvent, an LTO powder (15 g) having an average particle diameter d50 of about 10 μm was added and mixed, whereby a slurry was formed. Then, as shown in FIG. 12, the obtained slurry was applied to a polyethylene terephthalate (PET) film 70 having a thickness of 150 μm using an automatic film applicator (manufactured by COTEC), whereby the polymer layer 201s having a width of 5.0 cm, a length of 10.0 cm, and a thickness of about 20 μm was formed. The polymer layer 201s was thinned to a thickness of about 5 μm by pressurizing and compressing the polymer layer 201s from both sides as described above, whereby the second current collector 201 was formed.

Subsequently, the electrolyte layer 204 was formed so as to cover the negative electrode active material 202 in a particulate form exposed from the third face 201a and the fourth face 201b of the second current collector 201. A method for forming the electrolyte layer 204 is the same as the method for forming the electrolyte layer 304 in the positive electrode 303. By doing this, the negative electrode 305 including the negative electrode active material 202 in a particulate form piercing the second current collector 201 and exposed from the third face 201a and the fourth face 201b, and the electrolyte layer 204 was obtained.

Subsequently, two layers of the positive electrode 303 and two layers of the negative electrode 305 were alternately laminated and thermally pressure-bonded to one another by applying a pressure of about 40 MPa for 5 minutes using a hot press maintained at 190° C., followed by cooling to room temperature. The thus obtained battery cell was hermetically enclosed in a package 307 as shown in FIG. 17, whereby the lithium battery 300 of Example 3 was obtained.

Related Art Example

Figure 23:
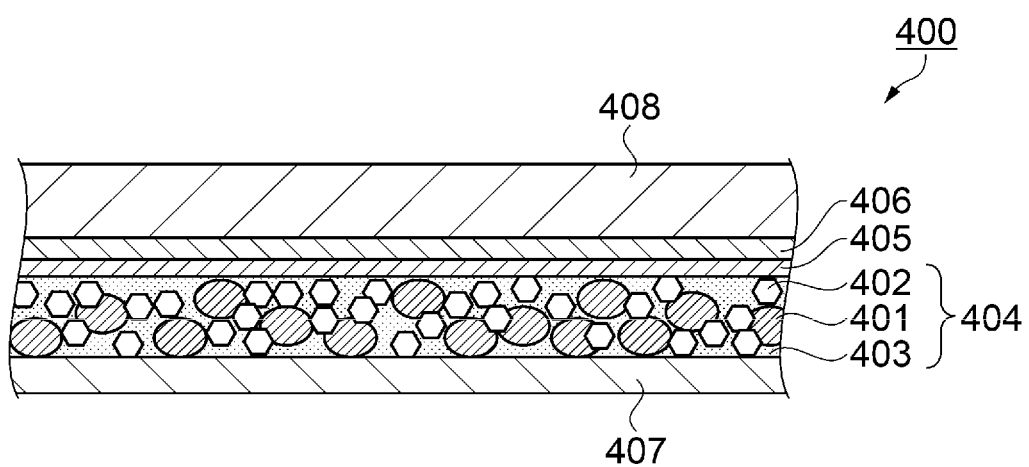
FIG. 23 is a schematic cross-sectional view showing a structure of a lithium battery as a secondary battery of a related art example.

FIG. 23 is a schematic cross-sectional view showing a structure of a lithium battery as a secondary battery of a related art example. As shown in FIG. 23, a lithium battery 400 of a related art example is configured to include a positive electrode mixture layer 404 functioning as a positive electrode, an electrolyte layer 405, and a negative electrode 406, which are sandwiched between a first current collector 407 and a second current collector 408. The positive electrode mixture layer 404 is obtained by mixing a positive electrode active material 401, an electrolyte 402, and an electrically conductive binding layer 403. The binding layer 403 includes an electrical conduction aid and a binder.

More specifically, a material obtained by mixing an LCO powder (20.0 g) as a positive electrode active material 302, acetylene black (4.0 g) as the electrical conduction aid, $Li_2S$—$P_2S_5$ (20.0 g) which is a sulfide solid electrolyte as the electrolyte 402, polyvinylidene fluoride (8.0 g) as the binder, and heptane (60.0 g) as a solvent was applied to an aluminum foil having a thickness of 30 μm as the first current collector 407, followed by drying at 110° C. for 2 hours, whereby the positive electrode mixture layer 404 having a width of 5 cm, a length of 10 cm, and a thickness of 20 μm was obtained.

On a face on the side opposite to a face in contact with the aluminum foil of the positive electrode mixture layer 404, sputtering was performed in an Ar gas atmosphere using LOBO as a target, whereby the electrolyte layer 405 composed of LOBO having a thickness of 2.5 μm was formed. Then, metallic lithium was vacuum deposited on the electrolyte layer 405, whereby the negative electrode 406 having a width of 4.2 cm, a length of 9.0 cm, and a thickness of 4 μm was formed. Further, a copper foil having a thickness of 20 μm was pressure-bonded to the negative electrode 406, whereby the second current collector 408 was formed.

Capacity Density of Lithium Batteries of Examples and Related Art Example

Based on a theoretical capacity determined from the weight of the positive electrode active material on the basis of the configuration of each of the lithium batteries of Examples 1 to 3 and the related art example described above, a value obtained by dividing a discharge capacity when charge and discharge were performed at a current of 0.2 C (a 5-hour rate) of the theoretical capacity thereof at room temperature of 25° C. by the volume of a battery pack excluding a tab lead is defined as "capacity density", and when the capacity density of each lithium battery was determined, the following results were obtained.

The capacity density was 180 mAh/cm$^3$ in Example 1, 150 mAh/cm$^3$ in Example 2, 140 mAh/cm$^3$ in Example 3, and 120 mAh/cm$^3$ in the related art example. All the lithium batteries of Examples 1 to 3 achieved a higher capacity density than that of the related art example. Further, the ratio of the current collector to the volume of the battery excluding the package portion of each Example is 23.5% in Example 1, 20.8% in Example 2, 15.5% in Example 3, and 53.6% in the related art example.

Fourth Embodiment

Figure 24:
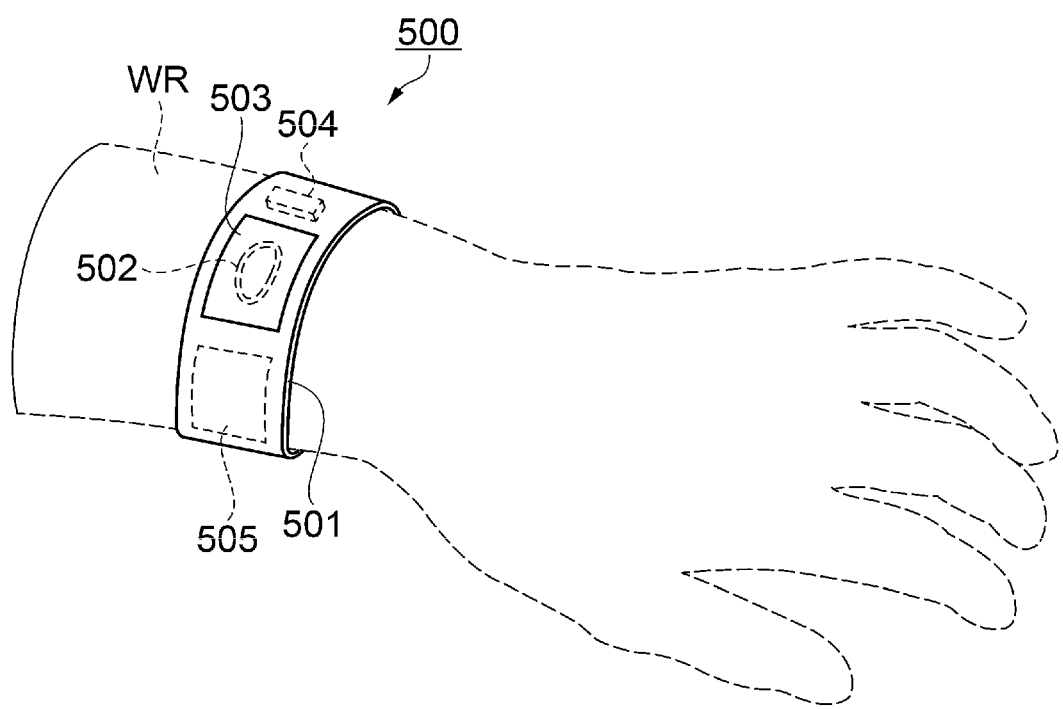
FIG. 24 is a perspective view showing a structure of a wearable apparatus as an electronic apparatus of a fourth embodiment.

Next, a wearable apparatus is cited as an example of an electronic apparatus to which the lithium battery as the secondary battery of this embodiment is applied and described with reference to FIG. 24. FIG. 24 is a perspective view showing a structure of a wearable apparatus as an electronic apparatus of a fourth embodiment.

As shown in FIG. 24, a wearable apparatus 500 as the electronic apparatus of this embodiment is an information apparatus which is worn on, for example, the wrist WR of a human body like a watch and can obtain information related to the human body, and includes, a band 501, a sensor 502, a display section 503, a processing section 504, and a battery 505.

The band 501 is formed in a belt shape using a resin having flexibility, for example, a rubber or the like so as to come into close contact with the wrist WR when it is worn, and has a binding section capable of adjusting the binding position in an end portion of the band.

The sensor 502 is, for example, an optical sensor, and is disposed on the inner face side (the wrist WR side) of the band 501 so as to come into contact with the wrist WR when it is worn.

The display section 503 is, for example, a light-receiving type liquid crystal display device, and is disposed on the outer face side (a side opposite to the inner face on which the sensor 502 is attached) of the band 501 so that a wearer can read the information displayed on the display section 503.

The processing section 504 is, for example, an integrated circuit (IC), and is incorporated in the band 501 and is electrically connected to the sensor 502 and the display section 503. The processing section 504 performs arithmetic processing for measuring the pulse rate, the blood glucose level, or the like based on the output from the sensor 502. In addition, the processing section 504 controls the display section 503 so as to display the measurement results or the like.

The battery 505 is incorporated in the band 501 in an attachable and detachable state as a power supply source which supplies power to the sensor 502, the display section 503, the processing section 504, etc. As the battery 505, a lithium battery in a sheet form obtained by miniaturizing the outer shape of the lithium battery 100 of the above-mentioned first embodiment is used. As the battery 505, a battery obtained by miniaturizing the outer shape of the lithium battery 200 of the above-mentioned second embodiment or the lithium battery 300 of the above-mentioned third embodiment may be used. The width, length, and thickness of the lithium battery in a sheet form are set according to the width, length, and thickness of the band 501. For example, when the width, length, and thickness of the band 501 were set to about 25 mm, about 100 mm, and about 2 mm, respectively, two batteries 505 having a width of 20 mm, a length of 40 mm, and a thickness of 0.4 mm are mounted on the front and rear faces of the band 501 to ensure the battery capacity.

According to the wearable apparatus 500 of this embodiment, by the sensor 502, information or the like associated with the pulse rate or the blood glucose level of a wearer is electrically detected from the wrist WR, and the pulse rate, the blood glucose level, or the like can be displayed on the display section 503 through the arithmetic processing or the like by the processing section 504. On the display section 503, not only the measurement results, but also, for example, information indicating the conditions of the human body predicted from the measurement results, time, etc. can be displayed.

Since the lithium battery in a sheet form obtained by further miniaturizing the lithium battery 100 which is small but has excellent charge and discharge characteristics is used as the battery 505, the wearable apparatus 500 which is lightweight and thin and can withstand long-term repetitive use can be provided. Further, the lithium battery 100 is a solid-state secondary battery, and therefore can be repetitively used by charging, and also there is no concern about leakage of an electrolytic solution or the like, and therefore, the wearable apparatus 500 which can be used safely over a long period of time can be provided.

In this embodiment, the wearable apparatus 500 of watch type is shown as an example, however, the wearable apparatus 500 may be a wearable apparatus to be worn on, for example, the ankle, head, ear, waist, or the like.

The electronic apparatus to which the lithium battery 100 is applied as the power supply source is not limited to the wearable apparatus 500. For example, a head-mounted display, a head-up display, a portable telephone, a portable information terminal, a notebook personal computer, a digital camera, a video camera, a music player, a wireless headphone, a gaming machine, and the like can be exemplified. Further, the lithium battery 100 can be applied not only to such consumer apparatuses (apparatuses for general consumers), but also to apparatuses for industrial use. In addition, the electronic apparatuses according to the invention may have another function, for example, a data communication function, a gaming function, a recording and playback function, a dictionary function, or the like.

The invention is not limited to the above-mentioned embodiments, and appropriate modifications are possible without departing from the gist or idea of the invention readable from the appended claims and the entire specification, and an electrode for a secondary battery and a secondary battery thus modified, a method for producing the electrode for a secondary battery and a method for producing the secondary battery, and an electronic apparatus to which the lithium battery is applied are also included in the technical scope of the invention. Other than the above-mentioned embodiments, various modification examples can be contemplated. Hereinafter, modification examples will be described.

Modification Example 1

In the lithium battery 100 of the above-mentioned first embodiment, the first current collector 101 constituting the positive electrode 103 is not limited to one formed using a metal material, and may be formed using an electrically conductive resin material.

Modification Example 2

In the lithium battery 200 of the above-mentioned second embodiment, the first current collector 201 constituting the negative electrode 203 is not limited to one formed using an electrically conductive resin material, and may be formed using a metal material.

Modification Example 3

In the lithium battery 300 of the above-mentioned third embodiment, the first current collector 301 constituting the positive electrode 303 or the second current collector 201 constituting the negative electrode 305 is not limited to one formed using an electrically conductive resin material, and may be formed using a metal material.

Modification Example 4

In the respective lithium batteries of the above-mentioned first to third embodiments, the package which hermetically encloses the battery cell is not limited to one constituted by two laminate films. For example, the material of the inner covering for enclosing the battery cell may be constituted by an insulating material, and it may be a package using a thin steel material such as stainless steel as the outer covering. According to this, excellent durability can be realized.

The entire disclosure of Japanese Patent Application No. 2017-208893, filed Oct. 30, 2017 is expressly incorporated by reference herein.

What is claimed is:

1. An electrode for a secondary battery, comprising:
  a current collector which has a first face and a second face opposing the first face; and
  an active material particle, the active material particle having a first end and a second end, the active material particle piercing the current collector with the first end exposed from the first face and the second end exposed from the second face.

2. The electrode for a secondary battery according to claim 1, wherein the active material particle is a lithium composite metal oxide containing at least one type of transition metal and has an average particle diameter of 500 nm to 30 μm.

3. The electrode for a secondary battery according to claim 2, wherein the current collector contains a metal material or an electrically conductive resin material.

4. The electrode for a secondary battery according to claim 1 comprising:
  an electrolyte layer which covers the active material particle exposed from the first face and the second face of the current collector.

5. A secondary battery, comprising:
  a first current collector which has a first face and a second face opposing the first face;
  an active material particle, the active material particle having a first end and a second end, the active material particle piercing the first current collector with the first end exposed from the first face and the second end exposed from the second face;
  an electrolyte layer which covers the active material particle exposed from the first face and the second face of the first current collector;
  an electrode which is in contact with the electrolyte layer; and
  a second current collector which is in contact with the electrode.

6. The secondary battery according to claim 5, wherein the battery includes a package which encloses the first current collector, the electrolyte layer, the electrode, and the second current collector.

7. The secondary battery according to claim 6, wherein the first current collector contains a metal material or an electrically conductive resin material.

8. A secondary battery, comprising:

a positive electrode including a first current collector which has a first face and a second face and a positive electrode active material particle which pierces the first current collector and is exposed from the first face and the second face;

a negative electrode including a second current collector which has a third face and a fourth face, and a negative electrode active material particle which pierces the second current collector and is exposed from the third face and the fourth face; and an electrolyte layer which is provided between the positive electrode and the negative electrode.

9. The secondary battery according to claim 8, wherein the battery includes a package which hermetically encloses the positive electrode, the negative electrode, and the electrolyte layer in a state where a portion of the first current collector and a portion of the second current collector are exposed.

10. The secondary battery according to claim 9, wherein the first current collector and the second current collector are composed of a metal material or an electrically conductive resin material.

11. An electronic apparatus, comprising:
a sensor;
a display;
a processor; and
the secondary battery according to claim 5.

12. An electronic apparatus, comprising:
a sensor;
a display;
a processor; and
the secondary battery according to claim 8.

* * * * *